(12) United States Patent
Xu et al.

(10) Patent No.: US 11,501,438 B2
(45) Date of Patent: Nov. 15, 2022

(54) CONE-BEAM CT IMAGE ENHANCEMENT USING GENERATIVE ADVERSARIAL NETWORKS

(71) Applicant: Elekta, Inc., Atlanta, GA (US)

(72) Inventors: Jiaofeng Xu, Saint Louis, MO (US); Xiao Han, Chesterfield, MO (US)

(73) Assignee: Elekta, Inc., Atlanta, GA (US)

( * ) Notice: Subject to any disclaimer, the term of this patent is extended or adjusted under 35 U.S.C. 154(b) by 1092 days.

(21) Appl. No.: 16/044,245

(22) Filed: Jul. 24, 2018

(65) Prior Publication Data

US 2019/0333219 A1  Oct. 31, 2019

Related U.S. Application Data

(60) Provisional application No. 62/662,933, filed on Apr. 26, 2018.

(51) Int. Cl.
*G06N 3/04* (2006.01)
*G06T 7/00* (2017.01)
(Continued)

(52) U.S. Cl.
CPC ............ *G06T 7/0014* (2013.01); *G06F 17/18* (2013.01); *G06N 3/0454* (2013.01); *G06N 3/088* (2013.01);
(Continued)

(58) Field of Classification Search
CPC ......... G06T 7/0014; G06T 2207/10081; G06T 2207/20081; G06F 17/18; G06N 3/0454; G06N 3/088
See application file for complete search history.

(56) References Cited

U.S. PATENT DOCUMENTS 10,573,032 B2  2/2020  Xu et al.
10,592,779 B2  3/2020  Madani et al.
(Continued)

FOREIGN PATENT DOCUMENTS

AU  2019257675  10/2021
AU  2019253572  11/2021
(Continued)

OTHER PUBLICATIONS

Zhu, Jun-Yan, Taesung Park, Phillip Isola, and Alexei A. Efros. "Unpaired image-to-image translation using cycle-consistent adversarial networks." In Proceedings of the IEEE international conference on computer vision, pp. 2223-2232. 2017. (Year: 2017).*

(Continued)

*Primary Examiner* — Casey R. Garner
(74) *Attorney, Agent, or Firm* — Schwegman Lundberg & Woessner, P.A.

(57) ABSTRACT

Techniques for generating an enhanced cone-beam computed tomography (CBCT) image using a trained model are provided. A CBCT image of a subject is received. a synthetic computed tomography (sCT) image corresponding to the CBCT image is generated, using a generative model. The generative model is trained in a generative adversarial network (GAN). The generative model is further trained to process the CBCT image as an input and provide the sCT image as an output. The sCT image is presented for medical analysis of the subject.

20 Claims, 9 Drawing Sheets

(51) Int. Cl.
G06N 3/08 (2006.01)
G06F 17/18 (2006.01)
(52) U.S. Cl.
CPC ............... G06T 2207/10081 (2013.01); G06T 2207/20081 (2013.01)

(56) References Cited

U.S. PATENT DOCUMENTS

| | | |
|---|---|---|
| 11,080,901 B2 | 8/2021 | Xu et al. |
| 11,100,632 B2 | 8/2021 | Han |
| 2013/0051519 A1 | 2/2013 | Yang et al. |
| 2013/0070991 A1 | 3/2013 | Yang et al. |
| 2013/0243298 A1 | 9/2013 | Sowards-emmero et al. |
| 2015/0201895 A1 | 7/2015 | Suzuki |
| 2015/0213633 A1 | 7/2015 | Chang et al. |
| 2016/0048972 A1 | 2/2016 | Kam et al. |
| 2016/0114192 A1 | 4/2016 | Lachaine et al. |
| 2017/0196529 A1 | 7/2017 | Lin et al. |
| 2017/0372193 A1* | 12/2017 | Mailhe ................. G06N 3/0472 |
| 2018/0070902 A1 | 3/2018 | Lin et al. |
| 2018/0374245 A1 | 12/2018 | Xu et al. |
| 2019/0057521 A1* | 2/2019 | Teixeira ............... G06N 3/0445 |
| 2019/0188870 A1 | 6/2019 | Park et al. |
| 2019/0197358 A1* | 6/2019 | Madani ................ G06N 3/0481 |
| 2019/0251713 A1* | 8/2019 | Chen ....................... A61B 6/482 |
| 2019/0259493 A1 | 8/2019 | Xu et al. |
| 2019/0304157 A1 | 10/2019 | Amer et al. |
| 2019/0318474 A1 | 10/2019 | Han |
| 2020/0151922 A1 | 5/2020 | Xu et al. |
| 2022/0012881 A1 | 1/2022 | Han |

FOREIGN PATENT DOCUMENTS

| | | |
|---|---|---|
| CN | 111684492 | 9/2020 |
| CN | 111971689 | 11/2020 |
| CN | 112204620 | 1/2021 |
| JP | H08153194 | 6/1996 |
| JP | 2018505705 | 3/2018 |
| JP | 2018192264 | 12/2018 |
| JP | 2019114262 | 7/2019 |
| JP | 2021521534 | 8/2021 |
| WO | 2019005180 | 1/2019 |
| WO | 2019199699 | 10/2019 |
| WO | 2019209820 | 10/2019 |

OTHER PUBLICATIONS

"International Application Serial No. PCT US2017 043479, Written Opinion dated Nov. 21, 2017", 6 pgs.
"International Application Serial No. PCT US2017 043479, International Search Report dated Nov. 21, 2017", 3 pgs.
Gauthier, Jon, "Conditional generative adversarial nets for convolutional face generation", Class Project for Stanford CS231N: Convolutional Neural Networks for Visual Recognition, Winter semester 2014.5, (2014), 9 pgs.
Isola, Phillip, "Image-to-Image Translation with Conditional Adversarial Networks", (Nov. 22, 2017), 18 pgs.
Jin, Kyong, "Deep Convolutional Neural Network for Inverse Problems in Imagin", IEEE Transactions on Image Processing Publication of the IEEE Signal Processing Society, (Jun. 15, 2017), 4509-4522.
Qingsong, Yang, "CT Image Denoising with Perceptive Deep Neural Networks", Arxiv.Org Cornell University Library 201 Olin Library Cornell University Ithaca NY, (Feb. 22, 2017), 8 pgs.
Schulze, R, "Artefacts in CBCT: a review", Dentomaxillofacial Radiology, (2011), 265-273.
Schulze, Ralf Kurt Willy, "On cone-beam computed tomography artifacts induced by titanium implants", Clinical Oral Implants Research Clin. Oral Impl. Res. 21, (2010), 100-107.
Wolterink, Jelmer M., "Deep MR to CT Synthesis using Unpaired Data", (Aug. 3, 2017), 10 pgs.
Wurfl, Tobias, "Deep Learning Computed Tomography", Network and Parallel Computing Notes in Computer Science Lect.Notes Computer Springer International Publishing CHAM, (Oct. 2, 2016), 432-440.
Zhu, Jun-Yan, "Unpaired Image-to-Image Translation using Cycle-Consistent Adversarial Networks", Berkeley AI Research (BAIR) laboratory, UC Berkeley, (Feb. 19, 2018), 20 pgs.
Zhu, Jun-Yan, "Unpaired Image-to-Image Translation using Cycle-Consistent Adversarial Networks", [Online]. Retrieved from the Internet: URL: https: junyanz.github.io CycleGAN , (Accessed Mar. 1, 2018), 8 pgs.
U.S. Appl. No. 17/443,035, filed Jul. 20, 2021, Image Synthesis Using Adversarial Networks Such as for Radiation Therapy.
"U.S. Appl. No. 15/964,983, Notice of Allowance dated Nov. 7, 2019", 20 pgs.
"U.S. Appl. No. 15/952,686, Non Final Office Action dated Dec. 12, 2019", 19 pgs.
"International Application Serial No. PCT US2017 043479, International Preliminary Report on Patentability dated Jan. 9, 2020", 8 pgs.
"U.S. Appl. No. 15/964,983, Corrected Notice of Allowability dated Jan. 15, 2020", 3 pgs.
"U.S. Appl. No. 15/964,983, Corrected Notice of Allowability dated Jan. 17, 2020", 16 pgs.
"U.S. Appl. No. 15/952,686, Response filed Mar. 11, 2020 to Non Final Office Action dated Dec. 12, 2019", 12 pgs.
Schulze, R, "Artefacts in CBCT: a review", The British Institute of Radiology 40, [Online] Retrieved from the internet http: dmfr.birjournals.org, (2011), 265-273.
Wojciech, Zbijewski, "Efficient Monte Carlo Based Scatter Artifact Reduction in Cone-Beam Micro-CT", IEEE, vol. 25, No. 7, (Jul. 7, 2006), 11 pgs.
U.S. Appl. No. 15/964,983, filed Apr. 27, 2018, Image Quality Improvement in Cone Beam Computed Tomography Images Using Deep Convolutional Neural Networks.
U.S. Appl. No. 15/952,686, filed Apr. 13, 2018, Image Synthesis Using Adversarial Networks Such as for Radiation Therapy.
"U.S. Appl. No. 15/952,686, Final Office Action dated Jun. 17, 2020", 19 pgs.
"Australian Application Serial No. 2017420781, First Examination Report dated Aug. 19, 2020", 4 pgs.
"European Application Serial No. 17746342.9, Response to Communication pursuant to Rules 161(1) and 162 EPC, response filed Aug. 24, 2020", 12 pgs.
"U.S. Appl. No. 16/739,951, Response filed May 10, 2021 to Non Final Office Action dated Mar. 15, 2021", 9 pgs.
"European Application Serial No. 19727531.6, Response to Communication pursuant to Rules 161(1) and 162 EPC filed May 14, 2021", 25 pgs.
"U.S. Appl. No. 16/739,951, Notice of Allowance dated May 27, 2021", 9 pgs.
"European Application Serial No. 19719052.3, Response to Communication pursuant to Rules 161(1) and 162 EPC filed May 26, 2021", 20 pgs.
"Australian Application Serial No. 2019257675, First Examination Report dated Jun. 8, 2021", 3 pgs.
"Australian Application Serial No. 2019257675, Response filed Jun. 17, 2021 to First Examination Report dated Jun. 8, 2021", 17 pgs.
"U.S. Appl. No. 16/739,951, Corrected Notice of Allowability dated Jun. 29, 2021", 3 pgs.
"U.S. Appl. No. 15/952,686, Corrected Notice of Allowability dated Jul. 8, 2021", 2 pgs.
"European Application Serial No. 17746342.9, Response filed Jul. 30, 2021 to Communication Pursuant to Article 94(3) EPC dated Mar. 26, 2021", 146 pgs.
Wolterink, Jelmer M, "Deep MR to CT Synthesis Using Unpaired Data", International Conference on Computer Analysis of Images and Patterns. CAIP 2017: Computer Analysis of Images and Patterns; [Lecture Notes in Computer Science; Lect.Notes Computer], Springer, Berlin, Heidelberg, (Sep. 26, 2017), 14-23.
"European Application Serial No. 17746342.9, Response filed Jan. 27, 2021 to Communication Pursuant to Article 94(3) EPC dated Oct. 29, 2020", 16 pgs.

(56) References Cited

OTHER PUBLICATIONS

"Japanese Application Serial No. 2019-572231, Notification of Reasons for Refusal dated Feb. 9, 2021", w English translation, 8 pgs.
"U.S. Appl. No. 16/739,951, Non Final Office Action dated Mar. 15, 2021", 5 pgs.
"Japanese Application Serial No. 2019-572231, Response filed Mar. 15, 2021 to Notification of Reasons for Refusal dated Feb. 9, 2021", w English claims, 10 pgs.
"European Application Serial No. 17746342.9, Communication Pursuant to Article 94(3) EPC dated Mar. 26, 2021", 5 pgs.
"U.S. Appl. No. 15/952,686, Notice of Allowance dated Apr. 12, 2021", 8 pgs.
"Australian Application Serial No. 2019253572, First Examination Report dated Apr. 21, 2021", 3 pgs.
"U.S. Appl. No. 15/952,686, Response filed Sep. 17, 2020 to Final Office Action dated Jun. 17, 2020", 11 pgs.
"U.S. Appl. No. 15/952,686, Non Final Office Action dated Oct. 2, 2020", 19 pgs.
"International Application Serial No. PCT US2019 026400, International Preliminary Report on Patentability dated Oct. 22, 2020", 10 pgs.
"European Application Serial No. 17746342.9, Communication Pursuant to Article 94(3) EPC dated Oct. 29, 2020", 6 pgs.
"International Application Serial No. PCT US2019 028710, International Preliminary Report on Patentability dated Nov. 5, 2020", 7 pgs.
"Australian Application Serial No. 2017420781, Response filed 11-24-40 to First Examination Report dated Aug. 19, 20", 32 pgs.
"U.S. Appl. No. 15/952,686, Examiner Interview Summary dated Dec. 22, 2020", 2 pgs.
"U.S. Appl. No. 15 952,686, Response filed Jan. 4, 2021 to Non Final Office Action dated Oct. 2, 2020", 10 pgs.
U.S. Appl. No. 16/739,951, filed Jan. 10, 2020, Image Quality Improvement in Cone Beam Computed Tomography Images Using Deep Convolutional Neural Networks.
"International Application Serial No. PCT US2019 026400, International Search Report dated Jun. 14, 2019", 4 pgs.
"International Application Serial No. PCT US2019 026400, Written Opinion dated Jun. 14, 2019", 8 pgs.
"International Application Serial No. PCT US2019 028710, International Search Report dated Aug. 22, 2019", 4 pgs.
"International Application Serial No. PCT US2019 028710, Written Opinion dated Aug. 22, 2019", 5 pgs.
Chartsias, Agisilaos, "Adversarial Image Synthesis for Unpaired Multi-modal Cardiac Data", Image Analysis and Recognition : 11th International Conference, ICIAR 2014, Vilamoura, Portugal, (Sep. 26, 2017), 1-11.
Dong, Nie, "Medical Image Synthesis with Context-Aware Generative Adversarial Networks", Arxiv.Org, Cornell University Library, 201 Olin Library Cornell University Ithaca, NY 14853, (Dec. 16, 2016), 12 pgs.
Matteo, Maspero, "Fast synthetic CT generation with deep learning for general pelvis MR-only Radiotherapy", Arxiv.Org, Cornell University Library, 201 Olin Library Cornell University Ithaca, NY 14853, (Feb. 19, 2018), 14 pgs.
Nie, Dong, "Estimating CT Image from MRI Data Using 3D Fully Convolutional Networks", (Sep. 27, 2016), 9 pgs.
"Japanese Application Serial No. 2020-556251, Notification of Reasons for Refusal dated Aug. 13, 2021", 11 pgs.
"Australian Application Serial No. 2019257675, Notice of Acceptance dated Jun. 29, 2021", (Jun. 29, 2021), 3 pgs.
Ben-Cohen, Avi, "Virtual PET Images from CT Data Using Deep Convolutional Networks: Initial Results", arXiv:1707.09585v1,, (Jul. 30, 2017), 1-9.
"U.S. Appl. No. 17/443,035, Preliminary Amendment filed Sep. 30, 2021", 7 pages.
"Australian Application Serial No. 2019253572, Response filed Oct. 11, 2021 to First Examination Report dated Apr. 21, 2021", 15 pgs.
"Japanese Application Serial No. 2020-556251, Response filed Nov. 19, 2021 to Notification of Reasons for Refusal dated Aug. 13, 2021", w English Claims, 13 pgs.
"Japanese Application Serial No. 2020-560263, Response filed Jan. 12, 2022 to Notification of Reasons for Refusal dated Nov. 2, 2021", w English Claims, 15 pgs.
"Japanese Application Serial No. 2020-556251, Examiners Decision of Final Refusal dated Jan. 18, 2022", w English Translation, 6 pgs.
"Japanese Application Serial No. 2020-560263, Notification of Reasons for Refusal dated Nov. 2, 2021", w English translation, 5 pgs.
"Japanese Application Serial No. 2021-082929, Notification of Reasons for Refusal dated Apr. 5, 22", w English translation, 16 pgs.
Yefeng, Zheng, "3D Deep Learning for Efficient and Robust Landmark Detection in Volumetric Data", MICCAI 2015, Part I, LNCS 9349, Springer International Publishing Switzerland, (Nov. 18, 2015), 565-572.

\* cited by examiner

GENERATIVE ADVERSARIAL NETWORK (GAN)

CONE-BEAM CT IMAGE ENHANCEMENT USING GENERATIVE ADVERSARIAL NETWORKS

This patent application claims the benefit of priority of U.S. Provisional Patent Application No. 62/662,933, titled "IMAGE QUALITY ENHANCEMENT FOR CONE-BEAM CT (CBCT)," filed on Apr. 26, 2018, the entirety of which is hereby incorporated by reference herein.

TECHNICAL FIELD

Embodiments of the present disclosure pertain generally to Cone-Beam Computed Tomography (CBCT) imaging, computed tomography imaging and artificial intelligence processing techniques. In particular, the present disclosure pertains to the generation and use of data models in generative adversarial networks (GANs) adapted for use with CBCT and computed tomography images and system operations.

BACKGROUND

X-ray cone-beam computed tomography (CBCT) imaging has been employed in radiation therapy for patient setup and adaptive re-planning. Under some circumstances, CBCT imaging has also been employed for diagnostic purposes, such as dental imaging and planning of implants. Moreover, X-ray CBCT imaging has been employed in many imaging-related applications, such as micro-computed tomography. However, the image quality of a CBCT image may be rather low, as observed by medical physicists, doctors, and researchers. In general, CBCT images may contain different types of artefacts (including various types of noise or visualized structure in the reconstructed data that is not present in the real object under investigation).

Artefacts and noise in CBCT images can sabotage adaptive treatment re-planning, affect diagnosis, or make many other image processing steps difficult or even impossible (such as image segmentation). Since each artefact can be caused by one or more different factors, different methods may be used suppress different artefacts. For radiation therapy and other clinical applications, generally, besides CBCT images (which may be obtained daily), there may be one or more other computed tomography (CT) image datasets available together (such as the planning CT images). Generally, CT images have much higher image-quality with more accurate contrast or other information, and less artefacts. Although researchers have done many investigations and developed several related methods for the purpose of reducing artefacts in CBCT images, currently, there is no existing simple and efficient method which can suppress all or most general artefacts. Therefore, there exists a significant need to develop a novel, efficient and simple method to suppress and remove artefacts and noise in CBCT images.

OVERVIEW

The present disclosure includes procedures to develop, train, and utilize artificial intelligence (AI) processing techniques to generate simulated or synthetic CT images that correspond or represent input CBCT images. Such AI processing techniques can include generative adversarial networks (GANs), cycle generative adversarial networks (CycleGANs), convolutional neural networks (CNNs), deep convolutional neural networks (DCNN), and other forms of machine learning (ML) implementations. The present disclosure specifically includes a number of illustrative examples relevant to the use of discriminator and generator models, operating within a GAN or CycleGAN, to learn a model of paired CBCT and real CT images to enhance and produce artefact free or substantially artefact free CBCT images or CBCT images with a substantially reduced number of artefacts. It will be apparent that the presently described use and analysis of imaging data (e.g., CBCT images) as part of a GAN or CycleGAN (and other disclosed AI and ML techniques) may be incorporated into other medical workflows used for a variety of diagnostic, evaluative, interpretative, or treatment settings.

In some embodiments, a computer implemented method for generating an enhanced cone-beam computed tomography (CBCT) image using a trained model is provided. A CBCT image of a subject is received. A synthetic computed tomography (sCT) image corresponding to the CBCT image is generated using a generative model. The generative model trained in a generative adversarial network (GAN), wherein the generative model is further trained to process the CBCT image as an input and provide the sCT image as an output. The sCT image is presented for medical analysis of the subject.

In some implementations, the generative adversarial network is configured to train the generative model using a discriminative model. Values applied by the generative model and the discriminative model are established using adversarial training between the discriminative model and the generative model. The generative model and the discriminative model include respective convolutional neural networks.

In some implementations, the adversarial training includes training the generative model to generate a given sCT image from a given CBCT image, and training the discriminative model to classify the given sCT image as a synthetic or a real computed tomography (CT) image. The output of the generative model is used for training the discriminative model and an output of the discriminative model is used for training the generative model.

In some implementations, the generative adversarial network is trained using a cycle generative adversarial network (CycleGAN) including the generative model and the discriminative model. The generative model is a first generative model, the discriminative model is a first discriminative model, wherein the CycleGAN further includes: a second generative model trained to process a given CT image as an input and provide a given synthetic (sCBCT) image as an output; and a second discriminative model trained to classify the given sCBCT image as a synthetic or a real CBCT image.

In some implementations, the CycleGAN includes first and second portions to train the first generative model. The first portion is trained to: obtain a training CBCT image that is paired with a real CT image; transmit the training CBCT image to the input of the first generative model to output a given synthetic CT image; and receive the given synthetic CT image at the input of the first discriminative model to classify the given synthetic CT image as a synthetic or real CT image and at the input of the second generative model to generate a cycle CBCT image for calculating cycle-consistency losses. The second portion is trained to: transmit the real CT image to the input of the second generative model to output a given synthetic CBCT image; and receive the given synthetic CBCT image at the input of the second discriminative model to classify the given synthetic CBCT image as a synthetic or real CBCT image and at the input of the first generative model to generate a cycle CT image for calculating cycle-consistency losses.

In some implementations, the first generative model is trained to minimize or reduce a first pixel based loss term that represents an expectation of difference between a plurality of synthetic CT images and respectively paired real CT images and the second generative model is trained to minimize or reduce a second pixel based loss term that represents an expectation of difference between a plurality of synthetic CBCT images and respectively paired real CBCT images.

In some implementations, the CycleGAN is trained to apply a metric to the first and second pixel based loss terms, the metric generated based on a map having a same size as a pair of a CBCT images and real CT images, such that each pixel value in the map represents a similarity level between a given CBCT image and a given real CT image that is paired with the given CBCT image.

In some implementations, the CycleGAN is trained to apply a threshold to the metric such that when the similarity level exceeds the threshold, the metric is applied to the first and second pixel based loss terms and otherwise a zero value is applied to the first and second pixel based loss terms.

In some implementations, the generative adversarial network is trained in accordance with an objective function that is based on adversarial losses, cycle-consistency losses and pixel based loss terms.

In some embodiments, a computer implemented method for training a model to generate an enhanced cone-beam computed tomography (CBCT) image is provided. A CBCT image of a subject is received as an input of a generative model. The generative model is trained in a generative adversarial network (GAN) to process the CBCT image to provide a synthetic computed tomography (sCT) image corresponding to the CBCT image as an output of the generative model.

In some implementations, the generative adversarial network is trained using a cycle generative adversarial network (CycleGAN) including the generative model and a discriminative model. The generative model is a first generative model, the discriminative model is a first discriminative model, further including: training a second generative model to process a given CT image as an input and provide a given synthetic (sCBCT) image as an output; and training a second discriminative model to classify the given sCBCT image as a synthetic or a real CBCT image.

In some implementations, the CycleGAN includes first and second portions to train the first generative model. A training CBCT image is obtained that is paired with a real CT image. The training CBCT image is transmitted to the input of the first generative model to output a given synthetic CT image. The given synthetic CT image is received at the input of the first discriminative model. The given synthetic CT image is classified, with the first discriminative model, as a synthetic or real CT image. The given synthetic CT image is received at the input of the second generative model to generate a cycle CBCT image for calculating cycle-consistency losses. The real CT image is transmitted to the input of the second generative model to output a synthetic training CBCT image. The synthetic training CBCT image is received at the input of the second discriminative model to classify the synthetic training CBCT image as a synthetic or real CBCT image and at the input of the first generative model to generate a cycle CT image for calculating cycle-consistency losses. The first generative model is trained to minimize or reduce a first pixel based loss term that represents an expectation of difference between a plurality of synthetic CT images and respectively paired real CT images.

The second generative model is trained to minimize or reduce a second pixel based loss term that represents an expectation of difference between a plurality of synthetic CBCT images and respectively paired real CBCT images.

In some embodiments, a system for generating an enhanced cone-beam computed tomography (CBCT) image using a trained model is provided. The system includes processing circuitry including at least one processor and a storage medium including instructions, which when executed by the at least one processor, cause the processor to: receive a CBCT image of a subject; generate, using a generative model, a synthetic computed tomography (sCT) image corresponding to the CBCT image, the generative model trained in a generative adversarial network (GAN), wherein the generative model is further trained to process the CBCT image as an input and provide the sCT image as an output; and present the sCT image for medical analysis of the subject.

In some implementations, the generative adversarial network is configured to train the generative model using a discriminative model; values applied by the generative model and the discriminative model are established using adversarial training between the discriminative model and the generative model; and the generative model and the discriminative model comprise respective convolutional neural networks. The adversarial training includes training the generative model to generate a given sCT image from a given CBCT image, and training the discriminative model to classify the given sCT image as a synthetic or a real computed tomography (CT) image. The output of the generative model is used for training the discriminative model and an output of the discriminative model is used for training the generative model.

In some implementations, the generative adversarial network is trained using a cycle generative adversarial network (CycleGAN) including the generative model and the discriminative model, wherein the generative model is a first generative model, the discriminative model is a first discriminative model. The CycleGAN further includes: a second generative model trained to process a given CT image as an input and provide a given synthetic (sCBCT) image as an output; and a second discriminative model trained to classify the given sCBCT image as a synthetic or a real CBCT image.

In some implementations, the CycleGAN comprises first and second portions to train the first generative model, and wherein: the first portion is trained to: obtain a training CBCT image that is paired with a real CT image; transmit the training CBCT image to the input of the first generative model to output a given synthetic CT image; and receive the synthetic training CT image at the input of the first discriminative model to classify the given synthetic CT image as a synthetic or real CT image and at the input of the second generative model to generate a cycle CBCT image for calculating cycle-consistency losses. The second portion is trained to: transmit the real CT image to the input of the second generative model to output a given synthetic CBCT image; and receive the given synthetic CBCT image at the input of the second discriminative model to classify the given synthetic CBCT image as a synthetic or real CBCT image and at the input of the first generative model to generate a cycle CT image for calculating cycle-consistency losses.

In some implementations, the first generative model is trained to minimize or reduce a first pixel based loss term that represents an expectation of difference between a plurality of synthetic CT images and respectively paired real CT images and the second generative model is trained to minimize or reduce a second pixel based loss term that represents an expectation of difference between a plurality of synthetic CBCT images and respectively paired real CBCT images.

In some implementations, the CycleGAN is trained to apply a metric to the first and second pixel based loss terms, the metric generated based on a map having a same size as a pair of a CBCT images and real CT images, such that each pixel value in the map represents a similarity level between a given CBCT image and a given real CT image that is paired with the given CBCT image.

In some implementations, the CycleGAN is trained to apply a threshold to the metric such that when the similarity level exceeds the threshold, the weight is applied to the first and second pixel based loss terms and otherwise a zero value is applied to the first and second pixel based loss terms.

In some implementations, the generative adversarial network is trained in accordance with an objective function that is based on adversarial losses, cycle-consistency losses and pixel based loss terms.

The above overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example but not by way of limitation, various embodiments discussed in the present document.

DETAILED DESCRIPTION

Figure 1:
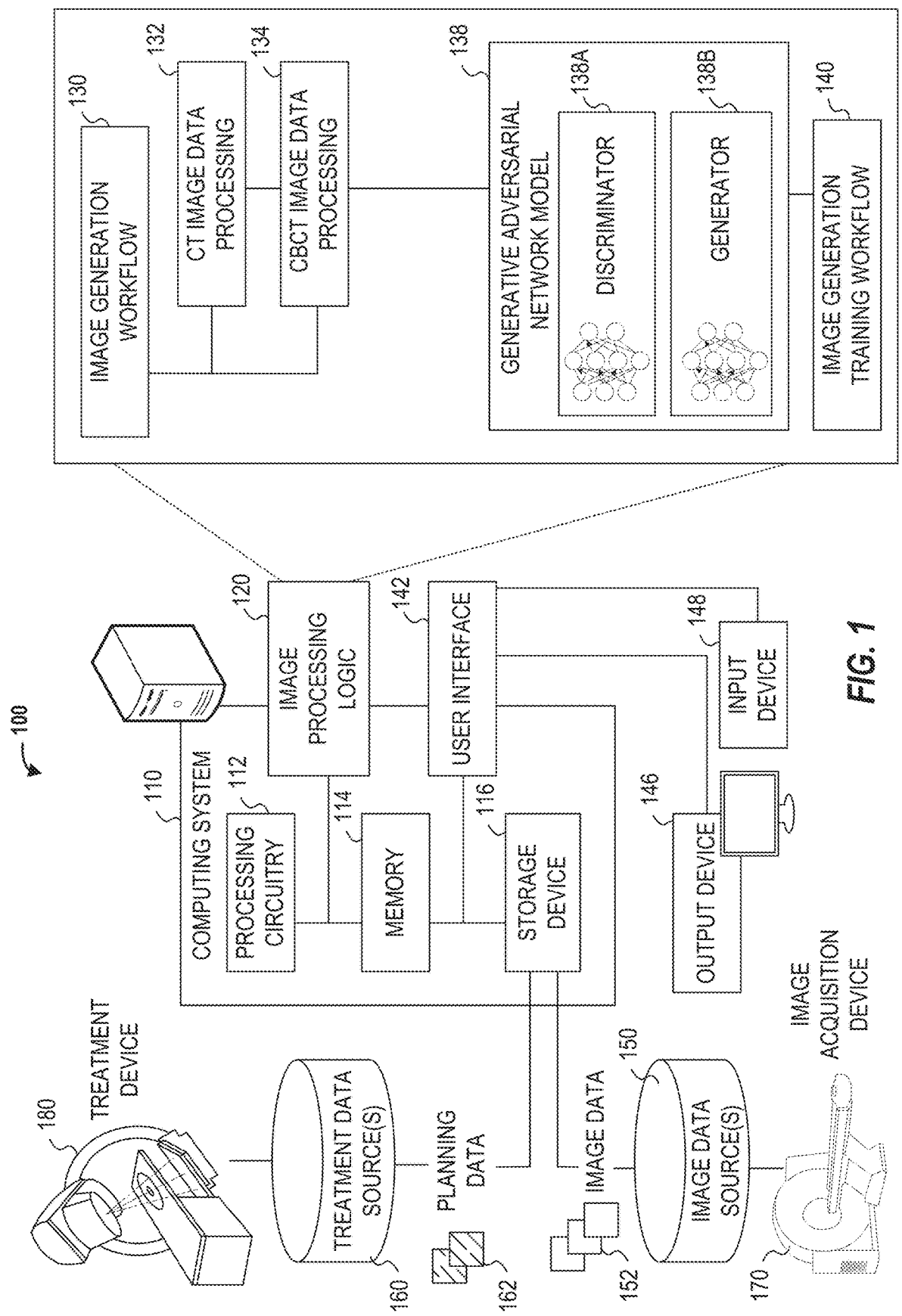
FIG. 1 illustrates an exemplary radiotherapy system adapted for performing treatment plan generation processing according to some examples.

The present disclosure includes various techniques to improve and enhance CBCT imaging by generating sCT images (synthetic or simulated CT images that represent a received CBCT image), including in a manner that provides technical advantages over manual (e.g., human-directed, -assisted or -guided) and conventional approaches for improving CBCT images. These technical advantages include reduced computing processing times to generate enhanced CBCT images or sCT images, removal of artefacts in CBCT images, and enhanced CBCT images, and accompanying improvements in processing, memory, and network resources used to generate and enhance CBCT images and sCT images. These improved CBCT images or sCT images may be applicable to a variety of medical treatment and diagnostic settings and the information technology systems used in such settings, in addition to the improvement in data management, visualization, and control systems that manage data to support such improved CBCT images or sCT images. Accordingly, in addition to these technical benefits, the present techniques may also result in many apparent medical treatment benefits (including improved accuracy of radiotherapy treatment, reduced exposure to unintended radiation, and the like).

As further discussed herein, the following uses and deployments of a generative adversarial network (GAN), a form of supervised artificial intelligence (AI) machine learning, enable an improvement in the accuracy and usefulness of a CBCT image by generating a sCT image through a learned model. In an example, the present techniques output a synthetic CT image that corresponds to an input CBCT image (e.g., of a human subject) and can include pixel values having an accuracy matching or comparable to real, true or actual CT imaging data (such CT images may be referred to throughout as real, true, or actual CT images). The learned models discussed herein may also produce a synthetic CT image (sCT) with superior high-image quality from an original low image-quality CBCT image. Such sCT images preserve anatomy structures in the original CBCT images and may remove or eliminate all or substantially all scattering, streaking artefacts and other noise artefacts to obtain high image quality with accurate and correct HU values. The sCT images can be produced on the fly in real time (e.g., the disclosed model can generate and enhance CBCT images as they are received).

In an example, the learned models are produced using a pair of deep convolutional neural networks operating in a GAN or CycleGAN: a generator (also referred to as a "generative model") that produces estimates of the probability distribution describing the training data; and a discriminator (also referred to as a "discriminative model") that classifies generator samples as belonging to the generator or to the training data. The generator aims to emulate the data distribution of the training data as completely as possible, and thereby maximally confuse the discriminator. As a result, a generator is produced that is trained (in essence, "tuned") to maximize the results of regression in predictive modeling.

In an example, the GAN is trained on paired sets of CBCT images and real CT images, to train the model to generate a sCT image given a CBCT image. The CBCT images may be registered with the real CT images. The use of a GAN two-network (generator-discriminator) architecture may be used to produce a trained generative model that generates sCT images corresponding to received CBCT images that are superior to previous implementations and DNN architectures, including prior approaches of supervised ML in neural networks. Additionally, the use of a CycleGAN with the present techniques may provide additional improvements for improved training of the generator used to create the sCT images. These and a variety of other technological and functional benefits will be apparent from the following sections.

The approaches discussed herein enable the discovery of the properties of CBCT images and real CT images to generate new sCT images in real time as CBCT images are received. These approaches use a kind of statistical learning employed by GANs to obtain a much more detailed model of the linkages between CBCT images and real CT images.

One approach has explored basic use of deep learning networks for improving CBCT images. Such an approach is discussed in co-pending, commonly assigned U.S. patent application Ser. No. 15/964,983, filed Apr. 27, 2018, entitled "IMPROVING IMAGE QUALITY IN CONE BEAM COMPUTED TOMOGRAPHY IMAGES USING DEEP CONVOLUTIONAL NEURAL NETWORKS", which is hereby incorporated by reference in its entirety. However, this approach may still face some degree of blurry, misaligned, and limited accuracy CBCT images. Particularly, this prior approach uses a non-linear mapping to train the DCNN structure and such a mapping is usually learned using a manually established objective function. Such a function may minimize the L1-norm or L2-norm of differences between a CBCT image and a true CT image, which may be referred to as L1-loss and L2-loss, respectively to encourage the improved CBCT image to match the real CT image. Such minimization, though, using a manually-established object function may still end up producing blurry or over-smoothed CBCT images, which results in the loss of fine or subtle structures in the CBCT images.

In addition, the DCNN-type approach relies upon the accuracy of image correspondence for each pair of training data because during training, the non-linear mapping is learned for pairs of pixels at corresponding locations in the CBCT and real CT images. With the L1 or L2 loss function, the differences may be calculated at every image pixel and summed up. But, if pairs of pixels at corresponding locations in the CBCT and real CT images do not actually represent the same anatomical structure due to imperfect matching, the errors may propagate into the learning process and may end up producing uncertain predictions with fuzzy image appearance at such locations. Conventional systems have not explored ways of improving the operation and accuracy of a GAN, such as with the use of CycleGAN (e.g., that includes image map or image alignment constraints).

FIG. 1 illustrates an exemplary radiotherapy system 100 adapted to perform radiotherapy plan processing operations using one or more of the approaches discussed herein. These radiotherapy plan processing operations are performed to enable the radiotherapy system to provide radiation therapy to a patient based on specific aspects of captured medical imaging data and therapy dose calculations. Specifically, the following processing operations may be implemented as part of an image generation workflow 130 and an image generation training workflow 140, implemented by image processing logic 120. It will be understood, however, that many variations and use cases of the following trained models and image processing logic 120 may be provided, including in data verification, visualization, and other medical evaluative and diagnostic settings. Radiotherapy system 100 may use GAN to generate sCT images from a received CBCT image. The sCT image may represent an improved CBCT image with sharp-edge looking features that are akin to real CT images. Radiotherapy system 100 may thus produce sCT type of images for medical analysis in real-time using lower quality CBCT images that are captured of a region of a subject.

The radiotherapy system includes a radiotherapy processing computing system 110 which hosts image processing logic 120. The radiotherapy processing computing system 110 may be connected to a network (not shown), and such network may be connected to the Internet. For instance, a network can connect the radiotherapy processing computing system 110 with one or more medical information sources (e.g., a radiology information system (RIS), a medical record system (e.g., an electronic medical record (EMR)/ electronic health record (EHR) system), an oncology information system (OIS)), one or more image data sources 150, an image acquisition device 170 (e.g., an imaging modality), a treatment device 180 (e.g., a radiation therapy device), and a treatment data source 160. As an example, the radiotherapy processing computing system 110 can be configured to receive a CBCT image of a subject and generate a sCT image that corresponds to the CBCT image by executing instructions or data from the image processing logic 120, as part of operations to generate improved CBCT images to be used by the treatment device 180 and/or for output on device 146.

The radiotherapy processing computing system 110 may include processing circuitry 112, memory 114, a storage device 116, and other hardware and software-operable features such as a user interface 142, a communication interface (not shown), and the like. The storage device 116 may store transitory or non-transitory computer-executable instructions, such as an operating system, radiation therapy treatment plans (e.g., training CBCT images, real CT images, paring information that associates the training and real CT images, generated sCT images, adapted or modified CBCT images, and the like), software programs (e.g., image processing software, image or anatomical visualization software, AI implementations and algorithms such as provided by DL models, ML models, and neural networks, etc.), and any other computer-executable instructions to be executed by the processing circuitry 112.

In an example, the processing circuitry 112 may include a processing device, such as one or more general-purpose processing devices such as a microprocessor, a central processing unit (CPU), a graphics processing unit (GPU), an accelerated processing unit (APU), or the like. More particularly, the processing circuitry 112 may be a complex instruction set computing (CISC) microprocessor, a reduced instruction set computing (RISC) microprocessor, a very long instruction Word (VLIW) microprocessor, a processor implementing other instruction sets, or processors implementing a combination of instruction sets. The processing circuitry 112 may also be implemented by one or more special-purpose processing devices such as an application specific integrated circuit (ASIC), a field programmable gate array (FPGA), a digital signal processor (DSP), a System on a Chip (SoC), or the like. As would be appreciated by those skilled in the art, in some examples, the processing circuitry 112 may be a special-purpose processor, rather than a general-purpose processor. The processing circuitry 112 may include one or more known processing devices, such as a microprocessor from the Pentium™, Core™, Xeon™, or Itanium® family manufactured by Intel™, the Turion™, Athlon™, Sempron™, Opteron™, FX™, Phenom™ family manufactured by AMD™, or any of various processors manufactured by Sun Microsystems. The processing circuitry 112 may also include graphical processing units such as a GPU from the GeForce®, Quadro®, Tesla® family manufactured by Nvidia™, GMA, Iris™ family manufactured by Intel™, or the Radeon™ family manufactured by AMD™. The processing circuitry 112 may also include accelerated processing units such as the Xeon Phi™ family manufactured by Intel™. The disclosed embodiments are not limited to any type of processor(s) otherwise configured to meet the computing demands of identifying, analyzing, maintaining, generating, and/or providing large amounts of data or manipulating such data to perform the methods disclosed herein. In addition, the term "processor" may include more than one physical (circuitry based) or software based processor, for example, a multi-core design or a plurality of processors each having a multi-core design. The processing circuitry 112 can execute sequences of transitory or non-transitory computer program instructions, stored in memory 114, and accessed from the storage device 116, to perform various operations, processes, methods that will be explained in greater detail below. It should be understood that any component in system 100 may be implemented separately and operate as an independent device and may be coupled to any other component in system 100 to perform the techniques described in this disclosure.

The memory 114 may comprise read-only memory (ROM), a phase-change random access memory (PRAM), a static random access memory (SRAM), a flash memory, a random access memory (RAM), a dynamic random access memory (DRAM) such as synchronous DRAM (SDRAM), an electrically erasable programmable read-only memory (EEPROM), a static memory (e.g., flash memory, flash disk, static random access memory) as well as other types of random access memories, a cache, a register, a compact disc read-only memory (CD-ROM), a digital versatile disc (DVD) or other optical storage, a cassette tape, other magnetic storage device, or any other non-transitory medium that may be used to store information including image, data, or transitory or non-transitory computer executable instructions (e.g., stored in any format) capable of being accessed by the processing circuitry 112, or any other type of computer device. For instance, the computer program instructions can be accessed by the processing circuitry 112, read from the ROM, or any other suitable memory location, and loaded into the RAM for execution by the processing circuitry 112.

The storage device 116 may constitute a drive unit that includes a transitory or non-transitory machine-readable medium on which is stored one or more sets of transitory or non-transitory instructions and data structures (e.g., software) embodying or utilized by any one or more of the methodologies or functions described herein (including, in various examples, the treatment processing logic 120 and the user interface 142). The instructions may also reside, completely or at least partially, within the memory 114 and/or within the processing circuitry 112 during execution thereof by the radiotherapy processing computing system 110, with the memory 114 and the processing circuitry 112 also constituting transitory or non-transitory machine-readable media.

The memory device 114 and the storage device 116 may constitute a non-transitory computer-readable medium. For example, the memory device 114 and the storage device 116 may store or load transitory or non-transitory instructions for one or more software applications on the computer-readable medium. Software applications stored or loaded with the memory device 114 and the storage device 116 may include, for example, an operating system for common computer systems as well as for software-controlled devices. The radiotherapy processing computing system 110 may also operate a variety of software programs comprising software code for implementing the image processing logic 120 and the user interface 142. Further, the memory device 114 and the storage device 116 may store or load an entire software application, part of a software application, or code or data that is associated with a software application, which is executable by the processing circuitry 112. In a further example, the memory device 114 and the storage device 116 may store, load, and manipulate one or more radiation therapy treatment plans, imaging data, segmentation data, treatment visualizations, histograms or measurements, AI model data (e.g., weights and parameters), labels and mapping data, and the like. It is contemplated that software programs may be stored not only on the storage device 116 and the memory 114 but also on a removable computer medium, such as a hard drive, a computer disk, a CD-ROM, a DVD, a Blu-Ray DVD, USB flash drive, a SD card, a memory stick, or any other suitable medium; such software programs may also be communicated or received over a network.

Although not depicted, the radiotherapy processing computing system 110 may include a communication interface, network interface card, and communications circuitry. An example communication interface may include, for example, a network adaptor, a cable connector, a serial connector, a USB connector, a parallel connector, a high-speed data transmission adaptor (e.g., such as fiber, USB 3.0, thunderbolt, and the like), a wireless network adaptor (e.g., such as a IEEE 802.11/Wi-Fi adapter), a telecommunication adapter (e.g., to communicate with 3G, 4G/LTE, and 5G, networks and the like), and the like. Such a communication interface may include one or more digital and/or analog communication devices that permit a machine to communicate with other machines and devices, such as remotely located components, via a network. The network may provide the functionality of a local area network (LAN), a wireless network, a cloud computing environment (e.g., software as a service, platform as a service, infrastructure as a service, etc.), a client-server, a wide area network (WAN), and the like. For example, network may be a LAN or a WAN that may include other systems (including additional image processing computing systems or image-based components associated with medical imaging or radiotherapy operations).

In an example, the radiotherapy processing computing system 110 may obtain image data 152 from the image data source 150 (e.g., CBCT images), for hosting on the storage device 116 and the memory 114. An exemplary image data source 150 is described in detail in connection with FIG. 2B. In an example, the software programs operating on the radiotherapy processing computing system 110 may convert medical images of one format (e.g., MRI) to another format (e.g., CT), such as by producing synthetic images, such as a pseudo-CT image or sCT. In another example, the software programs may register or associate a patient medical image (e.g., a CT image or an MR image) with that patient's CBCT image subsequently created or captured (e.g., also represented as an image) so that corresponding images are appropriately paired and associated. In yet another example, the software programs may substitute functions of the patient images such as signed distance functions or processed versions of the images that emphasize some aspect of the image information.

In an example, the radiotherapy processing computing system 110 may obtain or communicate CBCT imaging data 152 from or to image data source 150. Such imaging data may be provided to computing system 110 to enhance or improve the imaging data using GAN or CycleGAN modeling to produce a sCT. The sCT may be used by treatment data source 160 or device 180 to treat a human subject. In further examples, the treatment data source 160 receives or updates the planning data as a result of a sCT generated by the image generation workflow 130; the image data source 150 may also provide or host the imaging data for use in the image generation training workflow 140.

In an example, computing system 110 may generate pairs of CBCT and real CT images using image data source 150. For example, computing system 110 may instruct a CBCT device to obtain an image of a target region of a subject (e.g., a brain region). Computing system 110 may store the image data in storage device 116 with an associated indication of a time and target region captured by the CBCT image. Computing system 110 may also instruct a CT imaging device to obtain an image of the same target region (e.g., the same cross section of the brain region) as a real CT image. Computing system 110 may associate the real CT image with the previously obtained CBCT image of the same region thus forming a pair of real CT and CBCT images for storage in device 116 as a training pair. Computing system 110 may continue generating such pairs of training images until a threshold number of pairs are obtained. In some implementations, computing system 110 may be guided by a human operator as to which target region to obtain and which CBCT images are paired with the real CT images.

The processing circuitry 112 may be communicatively coupled to the memory 114 and the storage device 116, and the processing circuitry 112 may be configured to execute computer executable instructions stored thereon from either the memory 114 or the storage device 116. The processing circuitry 112 may execute instructions to cause medical images from the image data 152 to be received or obtained in memory 114 and processed using the image processing logic 120. In further examples, the processing circuitry 112 may utilize software programs (e.g., image processing software) along with the image data 152 and other patient data to enhance or generate sCT images.

In addition, the processing circuitry 112 may utilize software programs to generate intermediate data such as updated parameters to be used, for example, by a neural network model, machine learning model, image generation workflow 130, image generation training workflow 140, or other aspects involved with generation of a sCT image with a GAN or CycleGAN as discussed herein. Further, such software programs may utilize the image processing logic 120 to implement the image generation workflow 130 to produce new or updated sCT images for deployment to the treatment data source 160 and/or presentation on output device 146, using the techniques further discussed herein. The processing circuitry 112 may subsequently then transmit the new or updated images via a communication interface and the network to the treatment device 180, where the radiation therapy plan will be used to treat a patient with radiation via the treatment device 180, consistent with results of the workflow 130 as trained with the workflow 140. Other outputs and uses of the software programs and the workflows 130, 140 may occur with use of the radiotherapy processing computing system 110.

In the examples herein (e.g., with reference to the generative adversarial network processing discussed with reference to FIGS. 3 and 4), the processing circuitry 112 may execute software programs that invoke the image processing logic 120 to implement functions of ML, DL, neural networks, and other aspects of artificial intelligence for sCT image generation from an input CBCT image. For instance, the processing circuitry 112 may execute software programs that train, analyze, predict, evaluate, and generate a sCT image from a received CBCT image as discussed herein.

In an example, the image data 152 may include one or more MRI image (e.g., 2D MRI, 3D MRI, 2D streaming MRI, 4D MRI, 4D volumetric MRI, 4D cine MRI, etc.), functional MRI images (e.g., fMRI, DCE-MRI, diffusion MRI), Computed Tomography (CT) images (e.g., 2D CT, 2D Cone beam CT, 3D CT, 3D CBCT, 4D CT, 4DCBCT), ultrasound images (e.g., 2D ultrasound, 3D ultrasound, 4D ultrasound), Positron Emission Tomography (PET) images, X-ray images, fluoroscopic images, radiotherapy portal images, Single-Photo Emission Computed Tomography (SPECT) images, computer generated synthetic images (e.g., pseudo-CT images) and the like. Further, the image data 152 may also include or be associated with medical image processing data, for instance, training images, and ground truth images, contoured images, and dose images. In other examples, an equivalent representation of an anatomical area may be represented in non-image formats (e.g., coordinates, mappings, etc.).

In an example, the image data 152 may be received from the image acquisition device 170 and stored in one or more of the image data sources 150 (e.g., a Picture Archiving and Communication System (PACS), a Vendor Neutral Archive (VNA), a medical record or information system, a data warehouse, etc.). Accordingly, the image acquisition device 170 may comprise a MRI imaging device, a CT imaging device, a PET imaging device, an ultrasound imaging device, a fluoroscopic device, a SPECT imaging device, an integrated Linear Accelerator and MRI imaging device, CBCT imaging device, or other medical imaging devices for obtaining the medical images of the patient. The image data 152 may be received and stored in any type of data or any type of format (e.g., in a Digital Imaging and Communications in Medicine (DICOM) format) that the image acquisition device 170 and the radiotherapy processing computing system 110 may use to perform operations consistent with the disclosed embodiments. Further, in some examples, the models discussed herein may be trained to process the original image data format or a derivation thereof.

In an example, the image acquisition device 170 may be integrated with the treatment device 180 as a single apparatus (e.g., a MRI device combined with a linear accelerator, also referred to as an "MRI-Linac"). Such an MRI-Linac can be used, for example, to determine a location of a target organ or a target tumor in the patient, so as to direct radiation therapy accurately according to the radiation therapy treatment plan to a predetermined target. For instance, a radiation therapy treatment plan may provide information about a particular radiation dose to be applied to each patient. The radiation therapy treatment plan may also include other radiotherapy information, such as beam angles, dose-histogram-volume information, the number of radiation beams to be used during therapy, the dose per beam, and the like. In some examples, the GAN-trained models in the image generation workflow 130 are used only to generate an enhanced CBCT image, and other workflows or logic (not shown) are used to translate this enhanced CBCT image into the specific beam angles and radiation physics used to accomplish the radiotherapy treatment.

The radiotherapy processing computing system 110 may communicate with an external database through a network to send/receive a plurality of various types of data related to image processing and radiotherapy operations. For example, an external database may include machine data (including device constraints) that provides information associated with the treatment device 180, the image acquisition device 170, or other machines relevant to radiotherapy or medical procedures. Machine data information may include radiation beam size, arc placement, beam on and off time duration, machine parameters, segments, multi-leaf collimator (MLC) configuration, gantry speed, MRI pulse sequence, and the like. The external database may be a storage device and may be equipped with appropriate database administration software programs. Further, such databases or data sources may include a plurality of devices or systems located either in a central or a distributed manner.

The radiotherapy processing computing system 110 can collect and obtain data, and communicate with other systems, via a network using one or more communication interfaces, which are communicatively coupled to the processing circuitry 112 and the memory 114. For instance, a communication interface may provide communication connections between the radiotherapy processing computing system 110 and radiotherapy system components (e.g., permitting the exchange of data with external devices). For instance, the communication interface may, in some examples, have appropriate interfacing circuitry from an output device 146 or an input device 148 to connect to the user interface 142, which may be a hardware keyboard, a keypad, or a touch screen through which a user may input information into the radiotherapy system.

As an example, the output device 146 may include a display device that outputs a representation of the user interface 142 and one or more aspects, visualizations, or representations of the medical images, the treatment plans, and statuses of training, generation, verification, or implementation of such plans. The output device 146 may include one or more display screens that display medical images, interface information, treatment planning parameters (e.g., contours, dosages, beam angles, labels, maps, etc.), treatment plans, a target, localizing a target and/or tracking a target, or any related information to the user. The input device 148 connected to the user interface 142 may be a keyboard, a keypad, a touch screen or any type of device that a user may input information to the radiotherapy system. Alternatively, the output device 146, the input device 148, and features of the user interface 142 may be integrated into a single device such as a smartphone or tablet computer (e.g., Apple iPad®, Lenovo Thinkpad®, Samsung Galaxy®, etc.).

Furthermore, any and all components of the radiotherapy system may be implemented as a virtual machine (e.g., via VMWare, Hyper-V, and the like virtualization platforms) or independent devices. For instance, a virtual machine can be software that functions as hardware. Therefore, a virtual machine can include at least one or more virtual processors, one or more virtual memories, and one or more virtual communication interfaces that together function as hardware. For example, the radiotherapy processing computing system 110, the image data sources 150, or like components, may be implemented as a virtual machine or within a cloud-based virtualization environment.

The image processing logic 120 or other software programs may cause the computing system to communicate with the image data sources 150 to read images into memory 114 and the storage device 116, or store images or associated data from the memory 114 or the storage device 116 to and from the image data sources 150. For example, the image data source 150 may be configured to store and provide a plurality of images (e.g., 3D MRI, 4D MRI, 2D MRI slice images, CT images, 2D Fluoroscopy images. X-ray images, raw data from MR scans or CT scans, Digital Imaging and Communications in Medicine (DICOM) metadata, etc.) that the image data source 150 hosts, from image sets in image data 152 obtained from one or more patients via the image acquisition device 170 in model training or generation use cases. The image data source 150 or other databases may also store data to be used by the image processing logic 120 when executing a software program that performs image processing operations of creating, modifying, or generating sCT images from received CBCT images. Further, various databases may store the data produced by the trained models, including the network parameters constituting the models learned by the generative adversarial network model 138 and the resulting predicted data. The radiotherapy processing computing system 110 thus may obtain and/or receive the image data 152 (e.g., 2D MRI slice images, CT images, 2D Fluoroscopy images, X-ray images, 3DMRI images, 4D MRI images, etc.) from the image data source 150, the image acquisition device 170, the treatment device 180 (e.g., a MRI-Linac), or other information systems, in connection with performing radiation treatment or diagnostic operations.

The image acquisition device 170 can be configured to acquire one or more images of the patient's anatomy for a region of interest (e.g., a target organ, a target tumor or both). Each image, typically a 2D image or slice, can include one or more parameters (e.g., a 2D slice thickness, an orientation, and a location, etc.). In an example, the image acquisition device 170 can acquire a 2D slice in any orientation. For example, an orientation of the 2D slice can include a sagittal orientation, a coronal orientation, or an axial orientation. The processing circuitry 112 can adjust one or more parameters, such as the thickness and/or orientation of the 2D slice, to include the target organ and/or target tumor. In an example, 2D slices can be determined from information such as a 3D CBCT or CT, or MRI volume. Such 2D slices can be acquired by the image acquisition device 170 in "near real-time" while a patient is undergoing radiation therapy treatment, for example, when using the treatment device 180 (with "near real-time" meaning acquiring the data in at least milliseconds or less).

The image processing logic 120 in the radiotherapy processing computing system 110 is depicted as implementing image generation workflow 130 which involves the use of a trained (learned) generative model (e.g., implementing the method described below with reference to FIG. 8). This generative model may be provided by a generator 138B trained as part of a generative adversarial network model 138. In an example, the plan generation workflow 130 operated by the image processing logic 120 integrates with real CT image data processing 132 and CBCT image data processing 134 to generate sCT images based on the mapped CT and CBCT images used in training.

In an example, the generator 138B includes learned weights and values as a result of a training involving use of a discriminator 138A and the generator 138B in the GAN 138, in connection with an image generation training workflow 140 that processes pairings of training data (e.g., parings of CBCT and real CT images). As indicated above, this training workflow 140 may obtain and utilize imaging data from the data sources 160, 170, and associated image data 152.

Figure 2A:
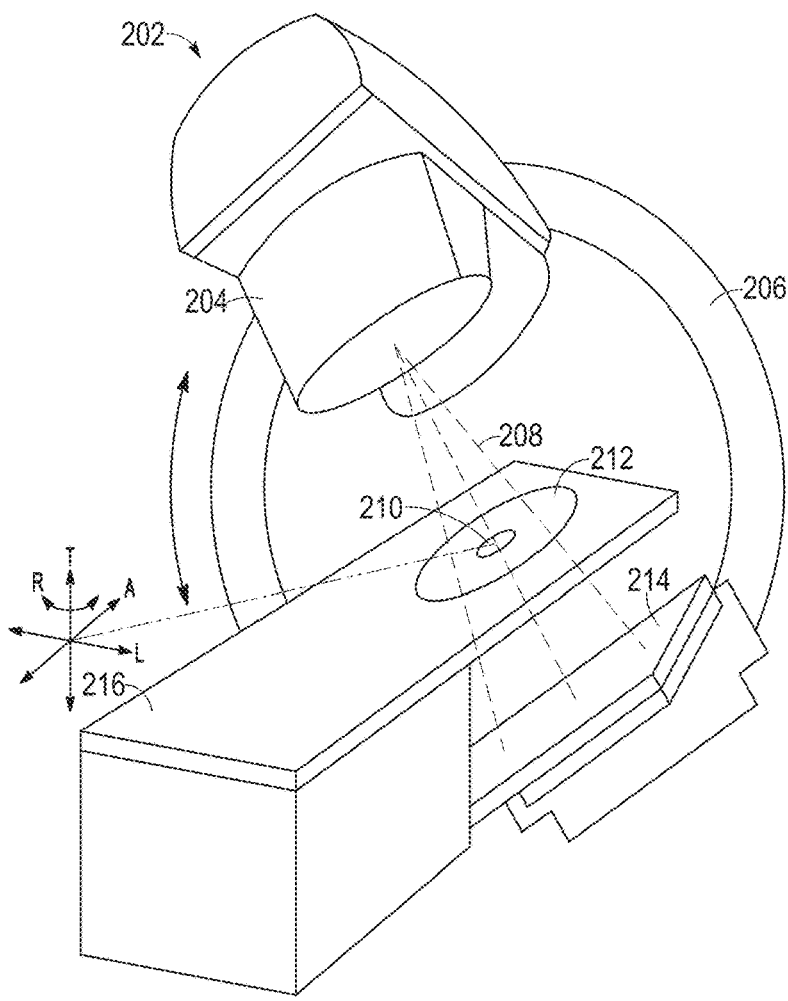
FIGS. 2A and 2B illustrate exemplary image-guided radiotherapy devices according to some examples of the disclosure.

FIG. 2A illustrates an exemplary image-guided radiotherapy device 202 that includes a radiation source, such as an X-ray source or a linear accelerator, a couch 216, an imaging detector 214, and a radiation therapy output 204. The radiation therapy device 202 may be configured to emit a radiation beam 208 to provide therapy to a patient. The radiation therapy output 204 can include one or more attenuators or collimators, such as a multi-leaf collimator (MLC). As will be understood, the radiation therapy output 204 may be provided in connection with the image processing logic 120 which implements an image generation workflow 130 and the associated use of an image generation from a generator 138B of a GAN.

As an example, a patient can be positioned in a region 212, supported by the treatment couch 216, to receive a radiation therapy dose according to a radiation therapy treatment plan. The radiation therapy output 204 can be mounted or attached to a gantry 206 or other mechanical support. One or more chassis motors (not shown) may rotate the gantry 206 and the radiation therapy output 204 around couch 216 when the couch 216 is inserted into the treatment area. In an example, gantry 206 may be continuously rotatable around couch 216 when the couch 216 is inserted into the treatment area. In another example, gantry 206 may rotate to a predetermined position when the couch 216 is inserted into the treatment area. For example, the gantry 206 can be configured to rotate the therapy output 204 around an axis ("A"). Both the couch 216 and the radiation therapy output 204 can be independently moveable to other positions around the patient, such as moveable in transverse direction ("T"), moveable in a lateral direction ("L"), or as rotation about one or more other axes, such as rotation about a transverse axis (indicated as "R"). A controller communicatively connected to one or more actuators (not shown) may control the couch 216 movements or rotations in order to properly position the patient in or out of the radiation beam 208 according to a radiation therapy treatment plan. Both the couch 216 and the gantry 206 are independently moveable from one another in multiple degrees of freedom, which allows the patient to be positioned such that the radiation beam 208 can precisely target the tumor.

The coordinate system (including axes A, T, and L) shown in FIG. 2A can have an origin located at an isocenter 210. The isocenter can be defined as a location where the central axis of the radiation therapy beam 208 intersects the origin of a coordinate axis, such as to deliver a prescribed radiation dose to a location on or within a patient. Alternatively, the isocenter 210 can be defined as a location where the central axis of the radiation therapy beam 208 intersects the patient for various rotational positions of the radiation therapy output 204 as positioned by the gantry 206 around the axis A.

Gantry 206 may also have an attached imaging detector 214. The imaging detector 214 is preferably located opposite to the radiation source (output 204), and in an example, the imaging detector 214 can be located within a field of the therapy beam 208. Imaging detector 214 may implement image processing logic 120 (FIG. 1) to generate sCT images from CBCT images in real time. The imaging detector 214 can be mounted on the gantry 206, preferably opposite the radiation therapy output 204, such as to maintain alignment with the therapy beam 208. The imaging detector 214 rotates about the rotational axis as the gantry 206 rotates. In an example, the imaging detector 214 can be a flat panel detector (e.g., a direct detector or a scintillator detector). In this manner, the imaging detector 214 can be used to monitor the therapy beam 208, or the imaging detector 214 can be used for imaging the patient's anatomy, such as portal imaging. The control circuitry of radiation therapy device 202 may be integrated within the radiotherapy system 100 or remote from it.

In an illustrative example, one or more of the couch 216, the therapy output 204, or the gantry 206 can be automatically positioned, and the therapy output 204 can establish the therapy beam 208 according to a specified dose for a particular therapy delivery instance. A sequence of therapy deliveries can be specified according to a radiation therapy treatment plan, such as using one or more different orientations or locations of the gantry 206, couch 216, or therapy output 204. The therapy deliveries can occur sequentially, but can intersect in a desired therapy locus on or within the patient, such as at the isocenter 210. A prescribed cumulative dose of radiation therapy can thereby be delivered to the therapy locus while damage to tissue nearby the therapy locus can be reduced or avoided.

Thus, FIG. 2A specifically illustrates an example of a radiation therapy device 202 operable to provide radiotherapy treatment to a patient, with a configuration where a radiation therapy output can be rotated around a central axis (e.g., an axis "A"). Other radiation therapy output configurations can be used. For example, a radiation therapy output can be mounted to a robotic arm or manipulator having multiple degrees of freedom. In yet another example, the therapy output can be fixed, such as located in a region laterally separated from the patient, and a platform supporting the patient can be used to align a radiation therapy isocenter with a specified target locus within the patient. In another example, a radiation therapy device can be a combination of a linear accelerator and an image acquisition device. In some examples, the image acquisition device may be an MRI, an X-ray, a CT, a CBCT, a spiral CT, a PET, a SPECT, an optical tomography, a fluorescence imaging, ultrasound imaging, or radiotherapy portal imaging device, etc., as would be recognized by one of ordinary skill in the art.

Figure 2B:
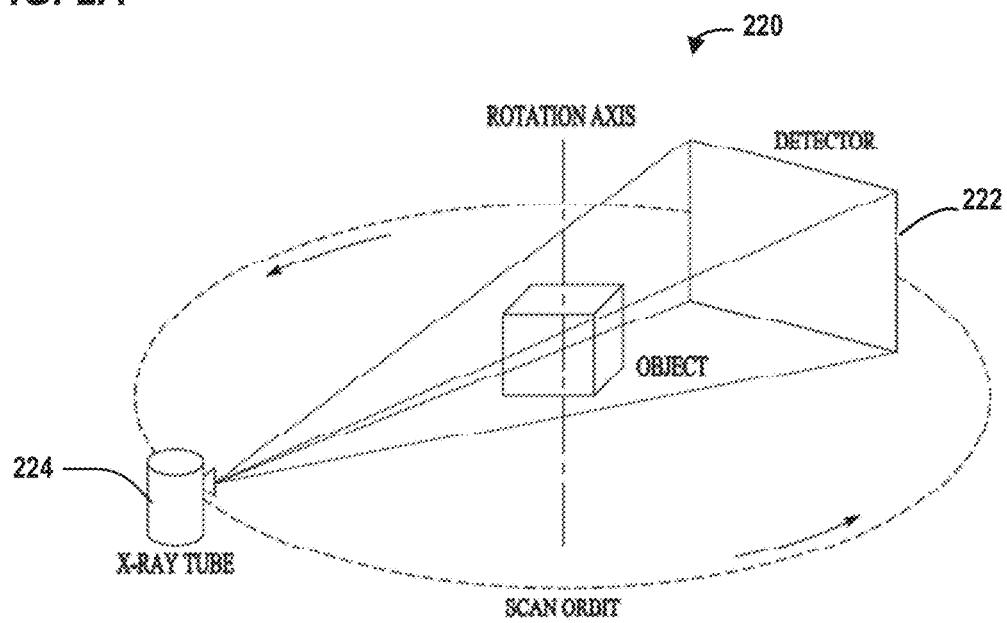

FIG. 2B illustrates an example of an X-ray cone beam computed tomography scanner 220 as one of the image acquisition devices of FIG. 2A and 170 (FIG. 1). The X-ray cone beam computed tomography scanner 220 can include an X-ray tube 224, and a detector 222. During operation, photons can be emitted from the X-ray tube 224 and can travel through a 3D object (e.g., a portion of a patient anatomy) before reaching the detector 222. The 3D object can absorb a portion of the emitted photons. The detector 222 can include a 2D flat plane that can convert received photons into corresponding electronic signals. The electronic signals can record the absorption strength along specific X-ray paths (straight-line paths), such as to form a 2D projection space image. To obtain 3D structural information of the 3D object, the 3D object can be rotated about a rotation axis or the X-ray tube 224 and detector 222 can be scanned in an orbit-like trajectory to obtain 2D projection space images from different view angles. In an example, the 2D projection space images can be collected over a range of more than 200 degrees, such as can correspond to hundreds of 2D projection space images.

Image reconstruction algorithms can be employed to form a 3D image of the 3D object from the 2D projection space images collected by the X-ray cone beam computed tomography scanner 220. The reconstruction algorithms can include analytical and iterative reconstruction algorithms. In an example, analytical algorithms (such as Feldkamp or Feldkamp-modified algorithms) can be used to process the 2D projection space images collected by the scanner 220 to obtain 3D reconstructed images. In an example, the analytical algorithms can process the 2D projection space images in several seconds. However, the 3D reconstructed images can suffer from artefacts, such as those introduced by discrepancies between the collected 2D projection space images and mathematical assumptions associated with the analytical algorithms. Additionally, artefacts can arise from other sources, such as noise. In an example, iterative algorithms can be used to process the 2D projection space images collected by the scanner 220 to obtain 3D reconstructed images. The iterative algorithms can suppress some, but not all types of artefacts associated with analytical algorithms and can obtain better quality images than analytical algorithms, but the iterative algorithms can take a much longer time than the analytical algorithms, even with advanced GPU technology. Neither analytical nor iterative algorithms are effective for all types of artefacts. Artefacts in the images can include any one or more of noise, scatter, extinction artefacts, beam hardening artefacts, exponential edge gradient effects, aliasing effects, ring artefacts, motion artefacts, or misalignment effects.

Noise artefacts can include additive noise from round-off errors or electrical noise. Noise artefacts can also include photon-count noise that can follow a Poisson distribution. CBCT machines can be operated at currents of milliamperes, which can be approximately one order of magnitude below that of CT machines, and thus signal-to-noise in CBCT images can be lower than in CT images. Scattering artefacts can be caused by photons scattered by an object that deviate from travel along a straight-line path. In certain reconstruction algorithms where photons can be assumed to be travelling in straight-line paths, artefacts can be introduced because of scattering. Scattering artefacts can include inhomogeneous darkening in CBCT 2D/3D images. Extinction artefacts can be present where an object contains strongly absorbing material and the photons cannot penetrate the object, leading to a signal on a detector that is very weak or zero. Absorption information can be lost where the signal on the detector is very weak or zero. Extinction artefacts in 2D CBCT projection space images can cause artefacts in reconstructed CBCT 2D/3D images, such as strong bright streak-like artefacts. Beam hardening artefacts can occur where a polychromatic x-ray beam is used to form the 2D CBCT projection space images. In a polychromatic x-ray beam, low energy x-rays can be preferentially absorbed by tissue in a patient, such as can lead to a relative increase in the ratio of high energy x-rays to low energy x-rays. The relative increase in the ratio can lead to artefacts in reconstructed CBCT 2D/3D images. Exponential edge gradient effects (EEGE) can occur at sharp edges with high contrast to neighbouring structures. The EEGE can be caused by averaging a measured intensity over a finite beam width, whereas the algorithms for reconstruction assume a zero beam width. The EEGE can provide for a reduced computed density value and can cause streaks tangent to long straight edges in a direction of projection. Aliasing artefacts can occur when an image sampling frequency (pixels per unit area) is less than twice the value of the spatial frequency being sampled. Aliasing artefacts can also occur as a result of a diverging cone beam, such as that used in collecting CBCT projection space images. Ring artefacts can be caused by defects or uncalibrated detector elements. Ring artefacts can appear as concentric rings centered about an axis of rotation. Motion artefacts and misalignment effects can be caused by a misalignment of any one of a source, object, and detector during collection of the CBCT images.

These CBCT images can be improved with uses of deep learning (DL)/machine learning (ML) approaches involving a GAN as discussed herein, such as using image processing logic 120 (FIG. 1). AI, DL, or ML are all based on mathematical analyses of random variable probabilities and their probability distributions. Typically random variables are observed as pairs X, Y, $\{x_i, y_i\}$, i=1, N, where for each value $x_i \in X$ we wish to assign it to a class or category represented by the scalar category index $y_i \in Y$ (classification), or assign it a numeric value according to some function $y_i = f(x_i)$ (regression).

All classification or regression methods rely on the concept of probability distributions to describe the random variables X, Y. The probability distribution for random variable X, p(x) (x is either discrete or continuous) must satisfy: 1) the domain of p(x) must be the set of all possible values of x, 2) for all $x \in X$, $p(x) \geq 0$, and 3)

$$\int_X p(x)dx = 1.$$

A sample x drawn from distribution p(x) is written x~p(x). The joint distribution of X, Y is written p(x, y) and the marginal distribution of x, p(x) given the joint distribution p(x, y) is p(x)=∫p(x, y)dy. The probability of observing y conditioned on the value of x is p(y|x)=p(x, y)/p(x). The conditional probability of observing y given data x is called the data likelihood. Bayes' rule connects the X, Y conditional likelihoods as p(y|x)=p(x|y)p(y)/p(x).

The goal of statistical learning is to determine a mapping $f : x \rightarrow y$ that associates any y with an x. One of the most important methods is maximum likelihood estimation. The training data are assumed to be generated by a process $p_{data}(x, y)$. Finding the mapping involves learning a model process $p_{model}(x;\theta)$ that includes parameters $\theta$ that the mapping is dependent on in addition to x. For example, the $\theta$ may include neural network layer weights and bias parameters. Maximum likelihood estimates the parameters $\theta_L$ that give the most likely values of x as $$\theta_L = \arg\max_\theta E_{x \sim p_{data}}[\log p_{model}(x;\theta)] \quad \text{(EQUATION 1)}$$

where E is the expected value of the bracketed argument. Since probability distributions are difficult to approximate, and since the goal is to minimize the difference between the $p_{data}(x)$ and the $p_{model}(x;\theta)$ distributions, the KL divergence provides a data-driven alternative.

$$D_{KL}(p_{data}||p_{model}) = E_{x \sim p_{model}}[\log p_{data}(x) - \log p_{model}(x)] \quad \text{(EQUATION 2)}$$

where the maximum likelihood is equivalent to minimizing the difference between the model and data distributions. The log $p_{data}(x)$ term is independent of the model so that to minimize $D_{KL}$ one needs to minimize, $$-E_{x \sim p_{data}}[\log p_{model}(x)] \quad \text{(EQUATION 3)}$$

which is the same as Equation (1) with the $\theta$ implied in model expression. The desired mapping is then $f(\theta):x \sim p_{model} \rightarrow y$.

The presently disclosed system for CT image modeling and sCT image generation provides a useful application of modern neural network technology to model radiotherapy treatment planning and image generation. Neural networks (NNs) have been studied since the 1960s for solutions to classification problems (assigning observed data x to one of two or more classes $y_i$, i=1, ..., n) and regression problems (associating observed data x with the value y of a parameter pertaining to that data). The generation of CT and CBCT image parameters may be considered a regression problem, which is produced through the use of a NN generative model learned through a GAN configuration.

Simple NNs consist of an input layer, a middle or hidden layer, and an output layer, each containing computational units or nodes. The hidden layer(s) nodes have input from all the input layer nodes and are connected to all nodes in the output layer. Such a network is termed "fully connected." Each node communicates a signal to the output node depending on a nonlinear function of the sum of its inputs. For a classifier, the number of input layer nodes typically equals the number of features for each of a set of objects being sorted into classes and the number of output layer nodes is equal to the number of classes. A network is trained by presenting it with the features of objects of known classes, and adjusting the node weights to reduce the training error by an algorithm called backpropagation. Thus, the trained network can classify novel objects whose class is unknown.

Neural networks have the capacity to discover relationships between the data and classes or regression values, and under certain conditions, can emulate any function $y=f(x)$ including non-linear functions. In ML, an assumption is that the training and test data are both generated by the same data-generating process, $p_{data}$, in which each $\{x_i, y_i\}$ sample is identically and independently distributed (i.i.d.). In ML, the goals are to minimize the training error and to make the difference between the training and test errors as small as possible. Underfitting occurs if the training error is too large; overfitting occurs when the train-test error gap is too large. Both types of performance deficiency are related to model capacity; large capacity may fit the training data very well but lead to overfitting; small capacity may lead to underfitting. Since DNNs have enormous capacity, overfitting is a more common concern in machine learning.

Deep learning is a machine learning method employing DNNs with large numbers of hidden layers with inputs and outputs arranged in complex ways and producing human level performance on image and speech recognition tasks. In the present examples, the DNNs can be trained to determine the relationship between observed data X and an output Y. The data $X=\{X_1, \ldots X_n\}$ is a collection of CBCT images and the output Y is a sCT image.

The action of the DNN is symbolically captured by the function $f(\bullet)$ $$Y^* = f(X;\Theta) \quad \text{(EQUATION 4)}$$

where $\Theta=(\theta_1 \ldots \theta_n)^T$ is a vector of the parameters pertaining to the trained NN for which the Y* is the closest approximation of the true Y observed in training. The DNN is trained using data sets $\{X,Y\}_i$, $i=1 \ldots, N$ of training CBCT images X and known real corresponding or registered CT images Y. Training minimizes a cost function $J(\Theta)$ of the sort $$J(\Theta^*) = \arg\min_\Theta \|Y - Y^*\|^2 \quad \text{(EQUATION 5)}$$

where $\Theta^*$ is the set of parameters that minimizes the mean squared error between the actual Y and the estimate Y*. In deep learning, the cost functions frequently express the data approximation function as a probabilistic function of the problem variables, or the conditional likelihood of observing Y given X and subject to the values of the parameters θ expressed as $P(Y|X;\Theta)$, for which the optimal parameters $\Theta_{ML}$ are obtained by maximizing the likelihood, $$\Theta_{ML} = \arg\max_\Theta P(Y|X;\Theta) \quad \text{(EQUATION 6)}$$

or alternatively $$\Theta_{ML} = \arg\max_\Theta \sum_{i=1}^T \log P(Y_i | X_i; \Theta). \quad \text{(EQUATION 7)}$$

summed over the training data.

The DNN output that results in the identification of sCT images belonging to real CT classes is an example of classification. In this case, the DNN output will be the real valued elements $y_i$ of the CBCT image map $Y=(y_1, \ldots, y_M)^T$, meaning that the network computation will be an example of regression.

DNNs have many more layers (are much deeper) than basic NN implementations, as DNNs often include dozens or hundreds of layers, each layer composed of thousands to hundreds of thousands of nodes, with the layers arranged in complex geometries. In addition to weighted sums of inputs, some layers compute other operations on the prior layer outputs such as convolution. Convolutions and the filters derived from them can locate edges in images, or temporal/pitch features in sound streams, and succeeding layers find larger structures composed of these primitives. Such trained DNNs which involve the use of convolutional layers are referred to as convolutional neural networks (CNNs).

Skip connections are an important CNN architectural innovation. Originally introduced to improve accuracy and shorten training, skip connections splice nodal data at one level of a network with that of nodes at another level. An important example is the U-Net architecture developed for medical image segmentation. As further discussed below, the "left" part of the "U" encodes the image data as convolution filter features and the "right" part of the "U" decodes those features onto successive higher-resolution representations. The combination of encoded and decoded features across the same network hierarchy levels leads to more accurate classifications. Another variation of a skip connection is implemented within each CNN block forcing training on differences (residuals) between layer outputs instead of the layer outputs directly. This "ResNet" architecture and its many variants can produce improved NN accuracy.

Figure 3A:
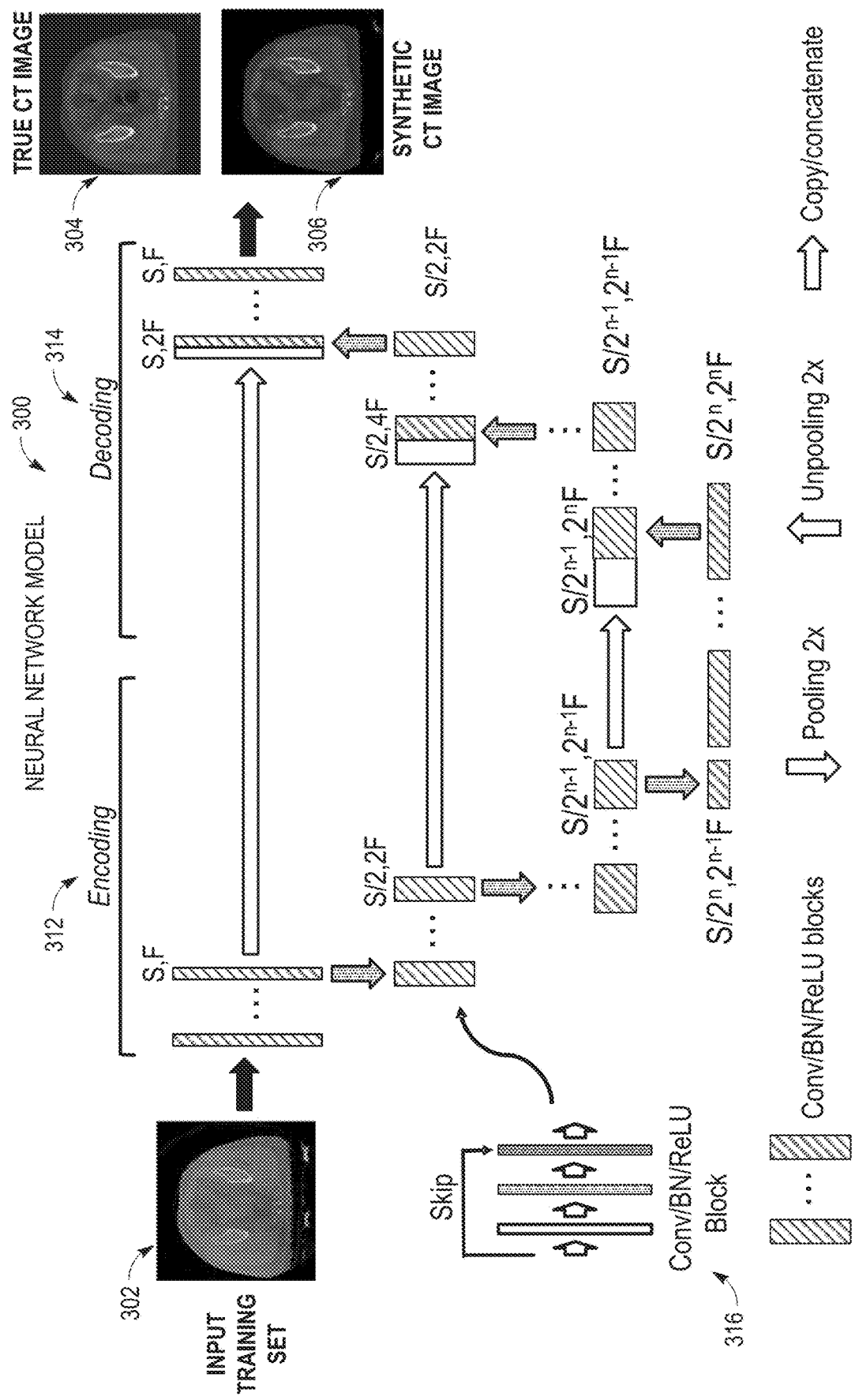
FIGS. 3A and 3B illustrate an exemplary convolutional neural network model adapted for generating and discriminating a sCT image from a received CBCT image according to some examples of the disclosure.

FIG. 3A illustrates an exemplary CNN model 300 adapted for generating a synthetic CT image (sCT) according to the present disclosure. Specifically, the model 300 depicts an arrangement of a "U-Net" deep CNN designed for generating an output data set (an output sCT image 306) based on an input training set (e.g., paired CBCT and CT images 302, 304). The name derives from the "U" configuration, and as is well understood, this form of a NN model can produce pixel-wise classification or regression results.

The left side of the model operations (the "encoding" operations 312) learns a set of features that the right side (the "decoding" operations 314) uses to reconstruct an output result. The U-Net has n levels consisting of conv/BN/ReLU (convolution/batch normalization/rectified linear units) blocks 316, and each block has a skip connection to implement residual learning. The block sizes are denoted in FIG. 3A by "S" and "F" numbers; input images are S×S in size, and the number of feature layers is equal to F. The output of each block is a pattern of feature responses in arrays the same size as the images.

Proceeding down the encoding path, the size of the blocks decreases by ½ or $2^{-1}$ at each level while the size of the features by convention increases by a factor of 2. The decoding side of the network goes back up in scale from $S/2^n$ while adding in feature content from the left side at the same level; this is the copy/concatenate data communication. The input images 302, 304 shown in FIG. 3A are provided for training the network to evaluate the conv/BN/ReLU layer parameters, as there would be no output image. For inference, or testing, with use of the model, the input would be a single image of the CBCT image 302 and the output would be a sCT image 306.

Figure 3B:
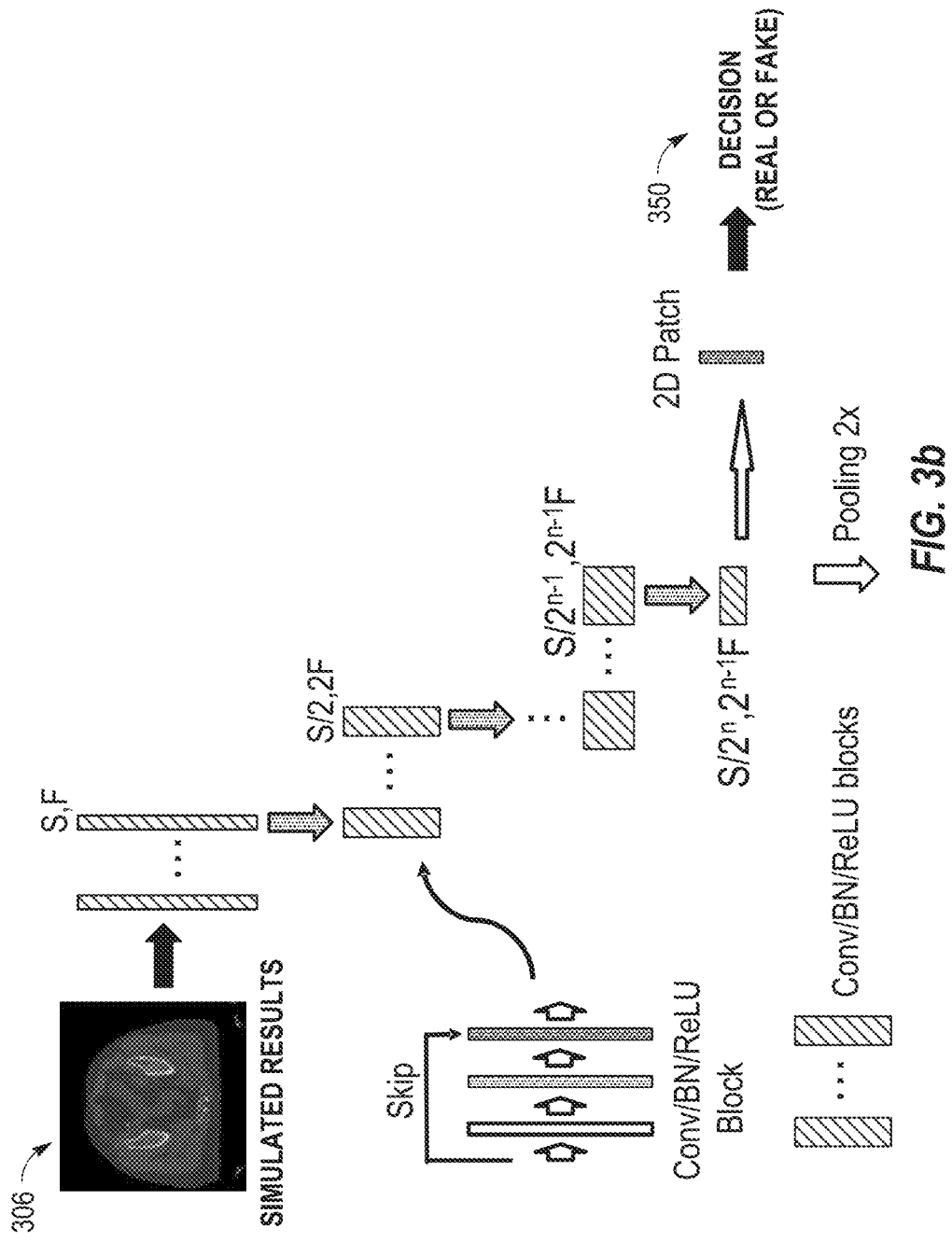

The representation of the model 300 of FIG. 3A thus illustrates the training and prediction of a generative model, which is adapted to perform regression rather than classification. FIG. 3B illustrates an exemplary CNN model adapted for discriminating a synthetic CT image (sCT) according to the present disclosure. The discriminator network shown in FIG. 3B may include several levels of blocks configured with stride-2 convolutional layers, batch normalization layers and ReLu layers, and separated pooling layers. At the end of the network, there will be one or a few fully connection layers to form a 2D patch for discrimination purpose. The discriminator shown in FIG. 3B may be a patch based discriminator configured to receive an input sCT image (e.g., from the generator shown in FIG. 3A) and classify the image as real or fake and provide the classification as output 350.

Consistent with embodiments of the present disclosure, the treatment modeling methods, systems, devices, and/or processes based on such models include two stages: training of the generative model, with use of a discriminator/generator pair in a GAN; and prediction with the generative model, with use of a GAN-trained generator. Various examples involving a GAN and a CycleGAN for sCT image generation are discussed in detail in the following examples. It will be understood that other variations and combinations of the type of deep learning model and other neural-network processing approaches may also be implemented with the present techniques. Further, although the following examples are discussed with reference to images and image data, it will be understood that the following networks and GAN may operate with use of other non-image data representations and formats.

In deep CNN training, the learned model is the values of layer node parameters θ (node weights and layer biases) determined during training. Training employs maximum likelihood or the cross entropy between the training data and the model distribution. A cost function expressing this relationship is $$J(\theta) = -E_{x,y \sim P_{data}} \log p_{model}(y|x) \quad \text{(EQUATION 8)}$$

The exact form of the cost function for a specific problem depends on the nature of the model used. A Gaussian model $p_{model}(y|x)=N(y;f(x;\theta))$ implies a cost function such as:

$$J(\theta) = \tfrac{1}{2} E_{x,y \sim P_{data}} \|y - f(x;\theta)\|_2^2 + \text{const} \quad \text{(EQUATION 9)}$$

Which includes a constant term that does not depend on θ. Thus, minimizing J(θ) generates the mapping $f(x;\theta)$ that approximates the training data distribution.

Figure 4:
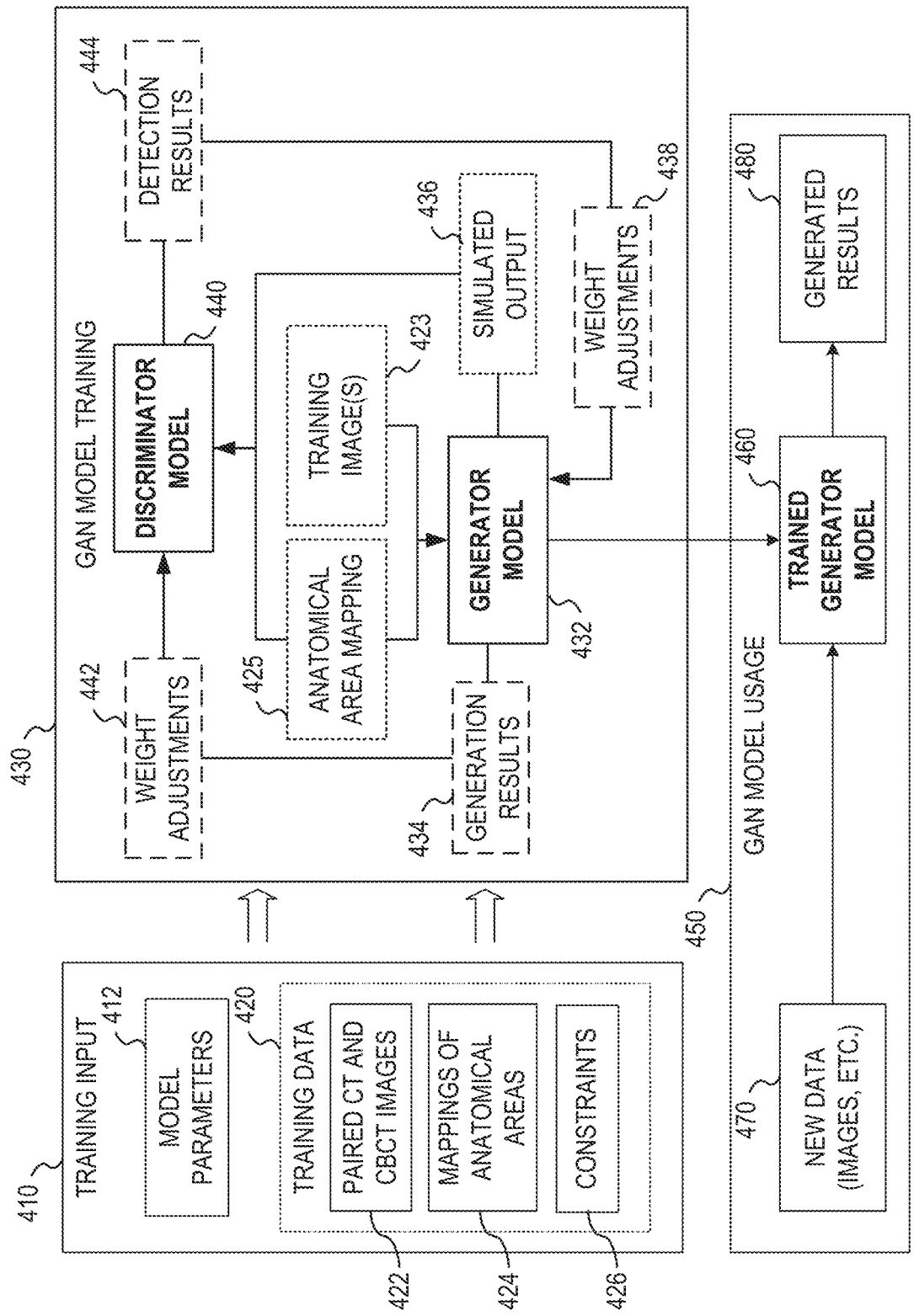
FIG. 4 illustrates an exemplary data flow for training and use of a generative adversarial network adapted for generating a sCT image from a received CBCT image according to some examples of the disclosure.

FIG. 4 illustrates an exemplary data flow for training and use of a generative adversarial network adapted for generating a synthetic CT image from a received CBCT image. For instance, the generator model 432 of FIG. 4, which is trained to produce a trained generator model 460, may be trained to implement the processing functionality 132, 134 provided as part of the image processing logic 120 in the radiotherapy system 100 of FIG. 1. Accordingly, a data flow of the GAN model usage 450 (prediction) is depicted in FIG. 4 as the provision of new data 470 (e.g., CBCT input images from a new patient) to a trained generator model 460, and the use of the trained generator model 460 to produce a prediction or estimate of generated results 480 (e.g., sCT images corresponding to the input CBCT images).

GANs comprise two networks: a generative network (e.g., generator model 432) that is trained to perform classification or regression and a discriminative network (e.g., discriminator model 440) that samples the generative network's output distribution (e.g., simulated output 436) and decides whether that sample is the same or different from the true test distribution. The goal for this system of networks is to drive the generator network to learn the ground truth model as accurately as possible such that the discriminator net can only determine the correct origin for generator samples with 50% chance, which reaches an equilibrium with the generator network. The discriminator can access the ground truth but the generator only accesses the training data through the response of the detector to the generator's output.

The data flow of FIG. 4 illustrates the receipt of training input 410, including various values of model parameters 412 and training data 420 (with such training images 423 including CBCT patient imaging data, real CT images corresponding to the patient imaging data, and/or mappings of anatomical areas 424 and 425, conditions or constraints 426). The training input is provided to the GAN model training 430 to produce a trained generator model 460 used in the GAN model usage 450. Mappings of anatomical areas 424 and 425 provide the metric used to compare similarities between two images (e.g., using SSIM weights).

As part of the GAN model training 430, the generator model 432 is trained on mappings of anatomical areas 424 and real CT and CBCT data pairs 422 (also depicted in FIG. 3A as 302, 304), to produce and map segment pairs in the CNN. In this fashion, the generator model 432 is trained to produce a simulated or synthetic CT image representation 436 based on an input map. The discriminator model 440 decides whether a simulated representation 436 is from the training data (e.g., the true CT image) or from the generator (e.g., the sCT, as communicated between the generator model 432 and the discriminator model 440 with the generation results 434 and the detection results 444). This training process results in backpropagation of weight adjustments 438, 442 to improve the generator model 432 and the discriminator model 440.

Thus, in this example, data preparation for the GAN model training 430 requires CT images that are paired with CBCT images (these may be referred to as training CBCT/CT images). In an example, the original data includes pairs of CBCT image sets and corresponding CT images that may be registered and resampled to a common coordinate frame to produce pairs of anatomy-derived 2D images.

In detail, in a GAN model, the generator (e.g., generator model 432) learns a distribution over the data x, $p_G(x)$, starting with noise input with distribution $p_z(z)$ as the generator learns a mapping $G(z;\theta_G):p_z(z) \rightarrow p_G(x)$ where G is a differentiable function representing a neural network with layer weight and bias parameters $\theta_G$. The discriminator, $D(x;\theta_D)$ (e.g., discriminator model 440), maps the generator output to a binary scalar (true, false), deciding true if the generator output is from actual data distribution $p_{data}(x)$ and false if from the generator distribution $p_G(x)$. That is, $D(x)$ is the probability that x came from $p_{data}(x)$ rather than from $p_G(x)$.

Figure 5:
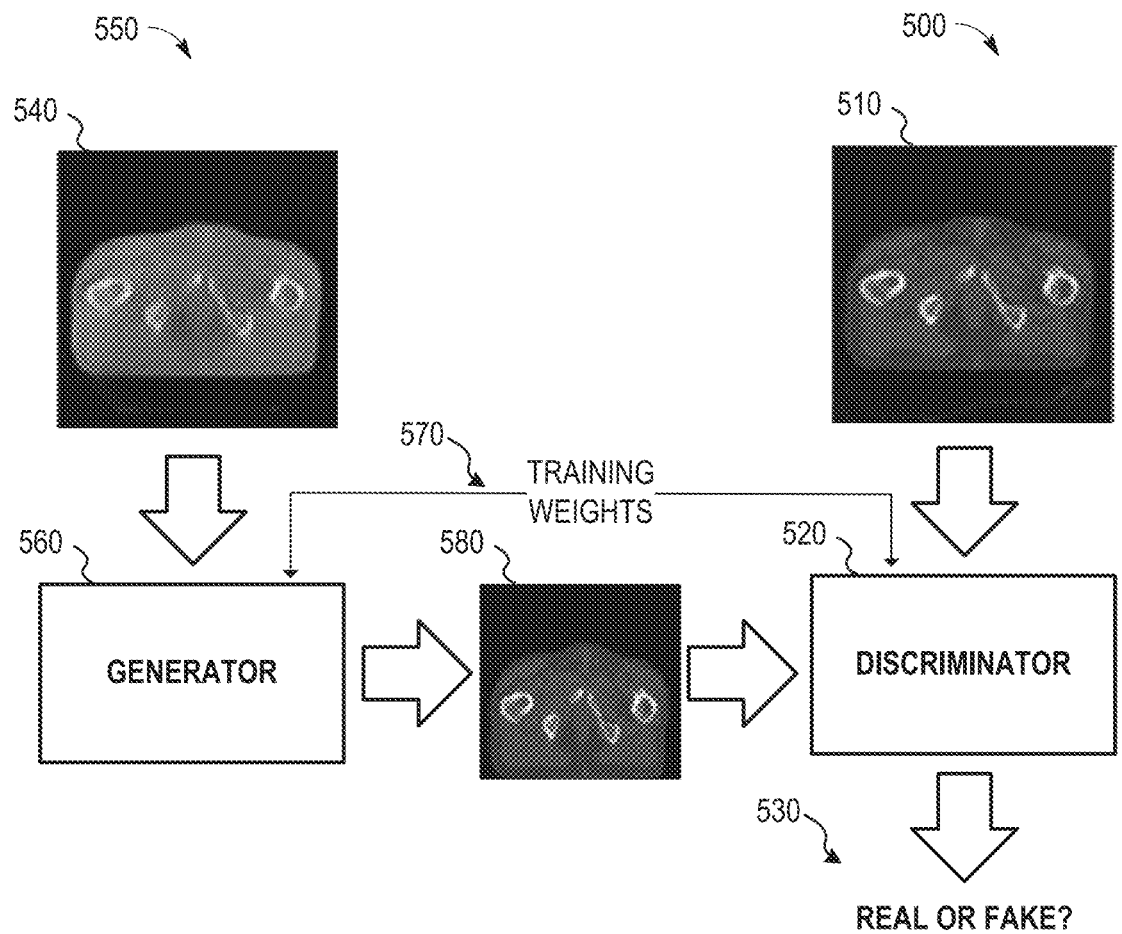
FIG. 5 illustrates training of a generative adversarial network for generating a sCT image from a received CBCT image according to some examples of the disclosure.

FIG. 5 illustrates training in a GAN for generating a synthetic CT image model, according to the example techniques discussed herein. FIG. 5 specifically shows the operation flow 550 of a GAN generator model G 560, designed to produce a simulated (e.g., estimated, artificial, etc.) output sCT image 580 as a result of an input CBCT image 540. FIG. 5 also shows the operation flow 500 of a GAN discriminator model D 520, designed to produce a determination value 530 (e.g., real or fake, true or false) based on an input (e.g., a real CT image 510 or the generated sCT image 580). In particular, discriminator model D 520 is trained to produce an output that indicates whether discriminator model D 520 determines the generated sCT image 580 is real or fake.

In the context of the GAN, the discriminator D 520 is trained to maximize the probability of assigning the correct label to samples from both distributions, whereas the generator G 560 is trained to minimize the $\log(1-D(G(z)))$, based on adjusted training weights 570 applied during training. D, G can be regarded as playing a two-player minimax game with value function V(D,G) as follows:

$$\min_G \max_D V(D,G) = E_{y \sim p(CT)}[\log D(y)] + E_{x \sim p(CBCT)}[\log(1-D(G(x)))] \quad \text{(EQUATION 10)}$$

Early in learning, when G is performing poorly, the $\log(1-D(G(x)))$ term dominates V(D,G) and causes early and incorrect termination. Instead of training G to minimize $\log(1-D(G(x)))$, G can be trained to maximize $\log(1-D(G(x)))$, thereby producing more informative gradients earlier in training. Further, as training progresses, the distribution $p_G(x)$ converges to the true data distribution $p_{data}(x)$.

Figure 6:
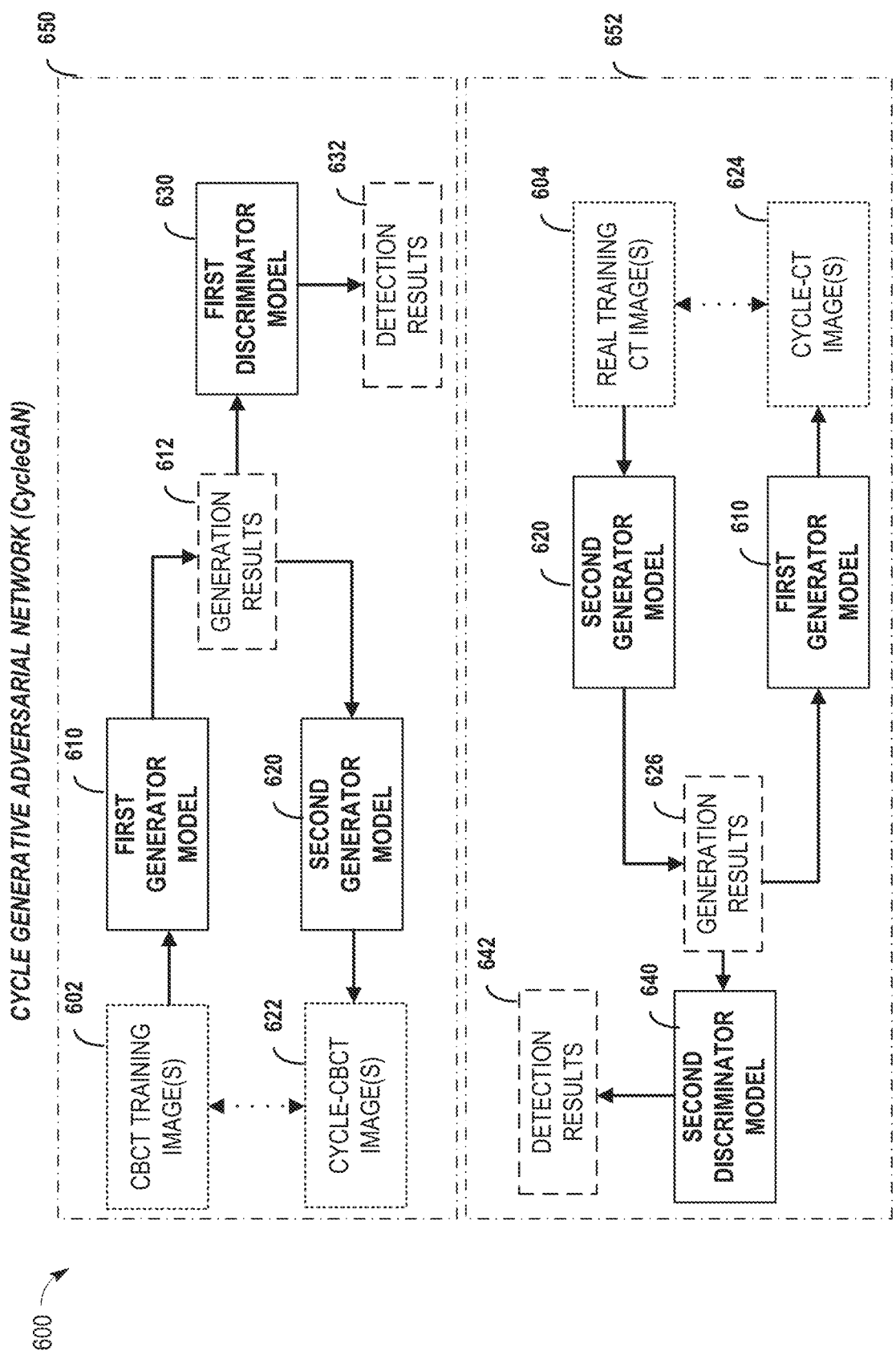
FIG. 6 illustrates training and use of a cycle generative adversarial network for generating a sCT image from a received CBCT image according to some examples of the disclosure.

A useful extension of a GAN is the CycleGAN which is described below in connection with FIG. 6. FIG. 6 illustrates training and use of CycleGAN 600 for generating a sCT image from a received CBCT image according to some examples of the disclosure. CycleGAN 600 includes first generator model 610, second generator model 620, first discriminator model 630 and second discriminator model 640. First generator model 610 and second generator model 620 may each be an implementation of generator model 432 (FIG. 4) (e.g., as regression-type DCNN models) and first discriminator model 630 and second discriminator model 640 may each be an implementation of discriminator model 440 (e.g., as classification-type DCNN models). CycleGAN 600 may be divided into two portions, first portion 650 and second portion 652.

In an example, in first portion 650, first generator model 610 may be trained to receive a CBCT training image 602 (which may include one of images 422) and generate a sCT image as generation results 612. Generation results 612 may be provided to first discriminator model 630. First discriminator model 630 may classify the sCT image as a real CT training image or a simulated CT training image and provide the classification as detection results 632. The generation results 612 and detection results 632 may be fed back to first generator model 610 and first discriminator model 630 to adjust weights implemented by first generator model 610 and first discriminator model 630. For example, generation result 612 (e.g., an sCT image generated by first generator model 610) may be used to calculate adversarial losses. Generation results 612 (e.g., sCT image) may also be concurrently provided to second generator model 620. Second generator model 620 may receive generation results 612 and generate a simulated CBCT image as output. The simulated CBCT image may be referred to as cycle CBCT image 622 and may be used to compute cycle losses to adjust weights of first/second generator model 610/620.

In an example, in second portion 652, second generator model 620 may be trained to receive a real CT training image 604 (which may include one of images 422) and generate a sCBCT image (synthetic or simulated CBCT image) as generation results 626. Generation results 626 may be provided to second discriminator model 640. Second discriminator model 640 may classify the sCBCT image as a real CBCT training image or a simulated CBCT training image and provide the classification as detection results 642. The generation results 626 and detection results 642 may be fed back to second generator model 620 and second discriminator model 640 to adjust weights implemented by second generator model 620 and second discriminator model 640. For example, generation result 626 (e.g., an sCBCT image generated by second generator model 620) may be used to calculate adversarial losses. Generation results 626 (e.g., sCBCT image) may also be concurrently provided to first generator model 610. First generator model 610 may receive generation results 626 and generate a sCT image as output. The sCT image may be referred to as cycle CT image 624 and may be used to compute cycle losses to adjust weights of first/second generator model 610/620.

In some examples, "adversarial losses" may account for the classification losses for the first and second discriminators 630 and 640. First and second discriminators 630 and 640 may classify whether the synthetic images have similar distribution as true images or not. For cycle-consistency losses, the losses are calculated between each pair of true CBCT and Cycle-CBCT images, and each pair of true CT image and Cycle-CT image, respectively. For example, a first loss may be calculated between CBCT training image 602 and cycle-CBCT image 622 and a second loss may be calculated between real training CT image 604 and cycle CT image 624. The Cycle-CBCT image 622 and Cycle-CT image 624 may both be obtained by doing forward and backward cycles. Each pair of true CBCT image 602 and Cycle-CBCT image 622 may be in the same CBCT image domain and each pair of true CT image 604 and Cycle-CT image 624 may be in the same CT image domain. The CycleGAN may accordingly rely on a whole pool (or a plurality) of true or real CBCT images 602 and a whole pool (or a plurality) of true CT images 604 to produce synthetic CT images (sCT images) 612 and synthetic CBCT images (sCBCT images) 622. Based on "adversarial losses" and "cycle-consistency losses," CycleGAN 600 may produce sharp synthetic CT images, which have similar image resolution as real CT images. This is at least one technological improvement over one of the earlier approaches, discussed above, of using DCNN to improve a given CBCT image.

In some examples, a processor (e.g., of system 100) may apply image registration to register real CT training images to training CBCT images. This may create a one-to-one corresponding relationship between CBCT and CT images in the training data. This relationship may be referred to as paired or a pair of CBCT and CT images. In one example, CycleGAN 600 may produce one or more sCT images that preserve the exact same anatomy structure or substantially the same structure as in the corresponding CBCT images and that also have similar high image-quality as real CT images, including the pixel value accuracy. In some cases, these anatomy structures may be determined from mappings of anatomical areas 424 (FIG. 4) which provide the metric representing similarity between two images. In an example, to preserve the pixel value accuracy of the sCT image, corresponding to the CBCT image (e.g., for the CBCT image to appear as a real CT image), additional constraints may be added to CycleGAN 600. These constraints may include adding pixel value losses that represent pixel value loss between sCT images and true CT images and between sCBCT images and true CBCT images. Such constraints may be part of constraints 426 (FIG. 4). These constraints that directly link sCT images with corresponding CT images may be represented by the following pixel value loss term (pixel based loss term):

$$\text{sCT-CT } L1 \text{ term: } E_{x \sim p(CBCT), y \sim p(CT)} \|G1(x) - y\|_1,$$

where x, y are paired CBCT and real CT images, G1 is the first generator model 610 (e.g., the CBCT to sCT generator), E represents the expectation for the L1 differences between all sCT images and corresponding true CT images, and G1(x) is the sCT image. The value for E may be retrieved from storage device 116, an external data source, human input, and/or may be updated continuously as additional sCT and sCBCT images are generated.

Another pixel value loss term may also be added as a constraint to directly link sCBCT images with corresponding CBCT images may be represented by the following pixel value loss term:

sCBCT-CBCT $L1$ term: $E_{x \sim p(CBCT), y \sim p(CT)} \|G2(y)-x\|_1$, where x, y are paired CBCT and CT images, G2 is the second generator model 620 (the real CT to sCBCT generator), and G2(x) is the sCBCT image.

These two pixel value loss terms (L1-norm terms) compare the sCT images with the corresponding true CT images and the sCBCT images with the corresponding true CBCT images. By minimizing or reducing these two L1-norm terms, the synthetic images will be more likely to match the pixel values with the targeted true/real images. More specifically, for example, by minimizing or reducing the sCT-CT L1-norm term, the produced sCT images can be forced or are more likely to have pixel-level accuracy and similarities with the corresponding CT images. This may provide a technological improvement over conventional systems since the absolute pixel values in medical images can represent some specific physical measurements or quantities. For example, the CT pixel values contain information about electron density, which is useful for radiation dose calculation. As another example, radiotherapy system 100 may more accurately direct radiotherapy or radiation towards a target region in a subject.

In another example, a metric, such as a weight, may be added to the pixel based loss term (e.g., to account for situations where the paired images are not perfectly aligned). Such a metric may be retrieved from constrains 426. The metric may be generated using a predetermined assigned weight, a universal quality index (UQI), local cross correlation, or using any other technique that measures similarity or other relationship between two images. For purposes of this disclosure, the metric used to measure relationship between the two images is an SSIM weight, but any other metric may be used. For example, an SSIM weighted L1-norm approach can be used to compensate for imperfect matching of paired CBCT-CT images. In particular, by minimizing or reducing the sCT-CT L1-norm term, Cycle-GAN 600 can enforce a constraint that the sCT images match the pixel values with the targeted true CT images. If all or substantially all of the paired CBCT-CT images are perfectly aligned, the targeted true CT images may have the same anatomy structures as the CBCT images. In such circumstances, the generated sCT images may also preserve the same anatomy structures in CBCT images. In some cases, the CBCT and CT images that are paired may not be perfectly aligned (e.g., because some anatomy structures (especially for some organs or soft tissues) of patients have changed between taking the CBCT image and the corresponding real CT image). In these cases, minimizing or reducing the sCT-CT and/or sCBCT-CBCT L1-loss terms may introduce errors into the trained generator and discriminator models (e.g., by enforcing generated synthetic CT images to match the corresponding CT images in those misaligned areas) causing some distortion in the generated images. One way to eliminate/suppress/reduce the potential distortion effects is with the addition of SSIM weights for the sCT-CT and sCBCT-CBCT pixel based loss terms, such as:

SSIM weighted sCT-CT $L1$ term: $E_{x \sim p(CBCT), y \sim p(CT)}$
  $SSIM(x,y) \cdot \|G1(x)-y\|_1$, and SSIM weighted sCBCT-CBCT $L1$ term:
  $E_{x \sim p(CBCT), y \sim p(CT)} SSIM(x,y) \cdot \|G2(y)-x\|_1$, In some implementations, the weight (SSIM(x,y)) may be a map (e.g., anatomical map 424), which has the same size or substantially the same size as the paired CBCT and CT images. Each pixel value in SSIM(x,y) may represent the similarity-level between the pairs of original CBCT and corresponding real CT image at the same pixel location. The pixel value range for SSIM may range from 0 to 1 (although other ranges are possible). The value of 1 may represent perfect structure similarity, which indicates the CBCT and the corresponding real CT images are well aligned at the image location, while 0 may represent the least structure similarity. For example, for every pair of CBCT and real CT images (e.g., for every pair of CBCT and real CT images stored in storage device 116), an SSIM map/image may be calculated (e.g., by processor of system 100). The SSIM map may be computed by system 110 upon forming a given pair of training images or after the threshold number of the training images has been obtained and stored. Computing system may use image modelling to determine for every pixel a probability that the CBCT and real CT image pairs are aligned and store that probability or update the SSIM value for that pixel with the determined probability. In some implementations, this probability value may be input by a human operator or guided by a physician. The SSIM weighted sCT-CT pixel based loss term may mean that if a pair of pixels between a pair of CBCT and real CT have a high SSIM value (close to 1) with strong similarity, then by minimizing the SSIM weighted L1-norm term, CycleGAN 600 may cause the sCT image to match the targeted CT image (e.g., because the similarity weight between the CBCT and CT image is large). On the other hand, if a pair of pixels between a pair of CBCT and real CT have a low SSIM value (close to 0), then by minimizing or reducing the SSIM weighted L1-norm term. CycleGAN 600 may avoid having the synthetic CT image match the target CT (e.g., because the weight is already small (close to 0)). In particular, the likelihood that the pixel value loss term is minimized or reduced at a given pixel location is decreased when the weight of the map indicates a low level of similarity between the pair of CT/CBCT images. This reduces the impact on the sCT of the difference between the two images at the pixel location. Also, the likelihood that the pixel value loss term is minimized or reduced at a given pixel location is increased when the weight of the map indicates a high level of similarity between the pair of CT/CBCT images. This increases the impact on the sCT of the difference between the two images at the pixel location. The SSIM weights provide a mechanism of enforcing different levels of strengths on sCT images to match the targeted real CT images on a pixel-by-pixel level.

Similarly, the SSIM weighted sCBCT-CBCT pixel based loss term may mean that, if a pair of pixels between a pair of CBCT and real CT have a high SSIM value (close to 1) with strong similarity, then by minimizing the SSIM weighted L1-norm term, CycleGAN 600 may cause the sCBCT image to match the targeted CBCT image (e.g., because the similarity weight between the CBCT and CT image is large). On the other hand, if a pair of pixels between a pair of CBCT and real CT have a low SSIM value (close to 0), then by minimizing or reducing the SSIM weighted L1-norm term, CycleGAN 600 may avoid having the synthetic CBCT image match the target CBCT (e.g., because the weight is already small (close to 0)). In particular, the likelihood that the pixel value loss term is minimized or reduced at a given pixel location is decreased when the weight of the map indicates a low level of similarity between the pair of CT/CBCT images. This reduces the impact on the sCBCT of the difference between the two images at the pixel location. Also, the likelihood that the pixel value loss term is minimized or reduced at a given pixel location is increased when the weight of the map indicates a high level of similarity between the pair of CT/CBCT images. This increases the impact on the sCBCT of the difference between the two images at the pixel location. The SSIM weights provide a mechanism of enforcing different levels of strengths on sCBCT images to match the targeted real CBCT images on a pixel-by-pixel level.

In another example, a thresholded SSIM weighted L1-norm approach can be used. This threshold value may be retrieved from constraints 426 (FIG. 4). In particular, a threshold can be placed on SSIM weights to select high similarity areas between the paired CBCT and real CT images and to ignore the low similarity areas. For example, when the weight values of SSIM(x,y) are less than a threshold α (a hyper-parameter), all those weights may be set to be zero (e.g., the weight may be ignored, thereby decreasing the likelihood that the loss term is reduced or minimized). For such areas, the sCT is not forced to match with CT image because the weights are zero (information for those difference between two images may not be available). As such, since weight=0, multiply the difference=0 meaning the differences between two images at those pixels have no impact. Instead, the process relies on the adversarial loss and cycle-consistency loss to recover those pixel areas. When the weight values are greater than or equal to the threshold α (the hyper-parameter), the weights have the same effect as discussed above on the pixel based loss value. This thresholded SSIM-weighted L1-norm can be expressed as:

$$SSIM_{T_\alpha}(x, y, \alpha) = \begin{cases} SSIM(x, y) & \text{if } SSIM(x, y) > \alpha \\ 0 & \text{otherwise} \end{cases}$$

The thresholded SSIM-weighted L1 sCT-CT pixel based loss term can be expressed as:

Threshold SSIM weighted sCT-CT $L1$ term:
$E_{x \sim p(CBCT), y \sim p(CT)} SSIM_{T_\alpha}(x,y) \cdot \|G1(x)-y\|_1$, The thresholded SSIM-weighted L1 sCBCT-CBCT term can be expressed as:

Threshold SSIM weighted sCBCT-CBCT $L1$ term:
$E_{x \sim p(CBCT), y \sim p(CT)} SSIM_{T_\alpha}(x,y) \cdot \|G2(y)-x\|_1$, A range of hyper-parameter α can be set between 0 and 1. In some examples, the value of hyper-parameter α may be set to be 0.5 or 0.6.

In some implementations, CycleGAN 600 may be implemented to generate a sCT image in accordance with an objective function that includes an adversarial loss term, a cycle consistency loss term, and a pixel based loss term (L1-norm term). The pixel based loss term may be weighted (e.g., SSIM weighted) and/or thresholded weighted. The adversarial losses may be determined using first/second generator models 610/620 and first/second discriminator models 630/640 and may be expressed as:

Adversarial losses: $L_{GANs}=L_{GAN}(G1,D_{ct},x,y)+L_{GAN}(G2,D_{cbct},y,x)$ where $L_{GAN}(G1,D_{ct},x,y)$ can be expressed as:

$$\min_{D_{ct}} L_{GAN}(D_{ct}, x, y) = E_{x \sim p(CBCT)}[D_{ct}(G1(x))]^2 + E_{y \sim p(CT)}[D_{ct}(y)-1]^2$$

$$\min_{G1} L_{GAN}(G1, x, y) = E_{x \sim p(CBCT)}[D_{ct}(G1(x))-1]^2$$

where $L_{GAN}(G2,D_{ct},x,y)$ can be expressed as:

$$\min_{D_{cbct}} L_{GAN}(D_{cbct}, y, x) =$$
$$E_{y \sim p(CT)}[D_{cbct}(G2(y))]^2 + E_{x \sim p(CBCT)}[D_{cbct}(x)-1]^2$$
$$\min_{G2} L_{GAN}(G2, y, x) = E_{y \sim p(CT)}[D_{cbct}(G2(y))-1]^2$$

Particularly. $D_{ct}$ may represent the first discriminator model 630 and G1 may represent the first generator model 610. Similar functions for $L_{GAN}(D_{cbct},x,y)$ and $L_{GAN}(G2,x,y)$ may be minimized or reduced, where $D_{cbct}$ may represent second discriminator model 640 and G2 may represent second generator model 620. The cycle consistency loss term may be determined using images 622 and 624 and may be expressed as:

Cycle-consistency losses: $L_{CYC}=E_{x \sim p(CBCT)}\|G2(G1(x))-x\|_1+E_{y \sim p(CT)}\|G1(G2(y))-y\|_1$ The total CycleGAN loss may be expressed as $L_{cyclegan}=L_{GANs}+\lambda_1 \cdot L_{CYC}$ The pixel based loss term may be expressed as:

$L1$ loss term: $L_{L1}=E_{x \sim p(CBCT), y \sim p(CT)}\|G1(x)-y\|_1+E_{x \sim p(CBCT), y \sim p(CT)}\|G2(y)-x\|_1$ In such cases, the total objective function can be expressed as:

$L_{cyclegan+L1}=L_{cyclegan}+\lambda_2 \cdot L_{L1}$

In cases where a weight (SSIM) is applied to the pixel based loss term, the weighted pixel based loss term may be expressed as:

$SSIM$-weighted $L1$ loss term: $L_{SSIM-L1} =$ $E_{x \sim p(CBCT), y \sim p(CT)} SSIM(x, y) \cdot \|G1(x) - y\|_1 +$ $E_{x \sim p(CBCT), y \sim p(CT)} SSIM(x, y) \cdot \|G2(y) - x\|_1$, In such cases, the total objective function can be expressed as:

$L_{cyclegan+SSIM-L1}=L_{cyclegan}+\lambda_2 \cdot L_{SSIM-L1}$

In cases where a thresholded weight (SSIM) is applied to the pixel based loss term, the thresholded weighted pixel based loss term may be expressed as:

thresholded $SSIM$-weighted $L1$ loss term:

$L_{SSIM_{T_\alpha}-L1} = E_{x \sim p(CBCT), y \sim p(CT)} SSIM_{T_\alpha}(x, y) \cdot \|G1(x) - y\|_1 +$ $E_{x \sim p(CBCT), y \sim p(CT)} SSIM_{T_\alpha}(x, y) \cdot \|G2(y) - x\|_1$, Accordingly, the total objective function can be expressed as:

$$L_{cyclegan+SSIM-L1} = L_{cyclegan} + \lambda_2 \cdot L_{SSIM_{T_a}-L1}$$

where $\lambda_1, \lambda_2$ control the relative strengths of the two losses, respectively. CycleGAN 600 may train first and second generators 610/620 in accordance with:

$$G1^*, G2^* = \arg\min_{G1,G2} \max_{D_{ct},D_{cbct}} L_{total}(G1, G2, D_{ct}, D_{cbct})$$

In some implementations, after being trained using Cycle-GAN 600, first generator model 610 may be used in system 100 to generate sCT images from acquired CBCT images. Other components of CycleGAN 600 may be excluded from system 100.

The preceding examples provide an example of how a GAN or CycleGAN may be trained based on CT and CBCT image pairs, specifically from image data in 2D image slices. It will be understood that the GAN or CycleGAN may process other forms of image data (e.g., 3D, or other multi-dimensional images). Further, although only grayscale (including black and white) images are depicted by the accompanying drawings, it will be understood that color images may be generated and/or processed by the GAN, as discussed in the examples below.

Figure 7:
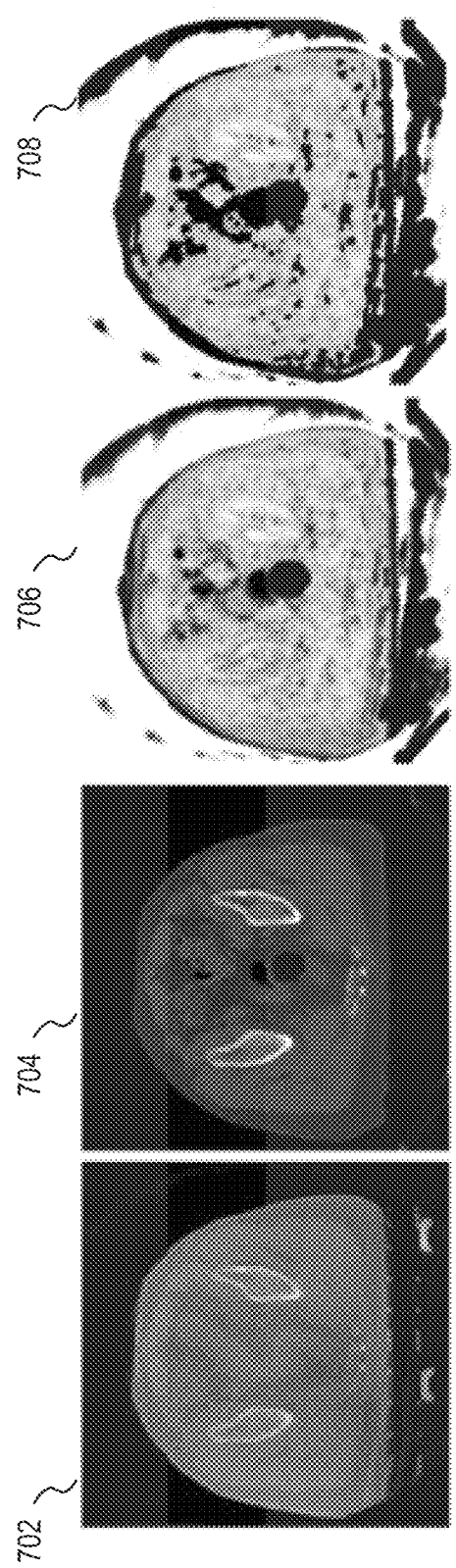
FIG. 7 illustrates variations of anatomical area information and input images used in connection with training and generating a sCT image from a received CBCT image according to some examples of the disclosure.
Figure 7:
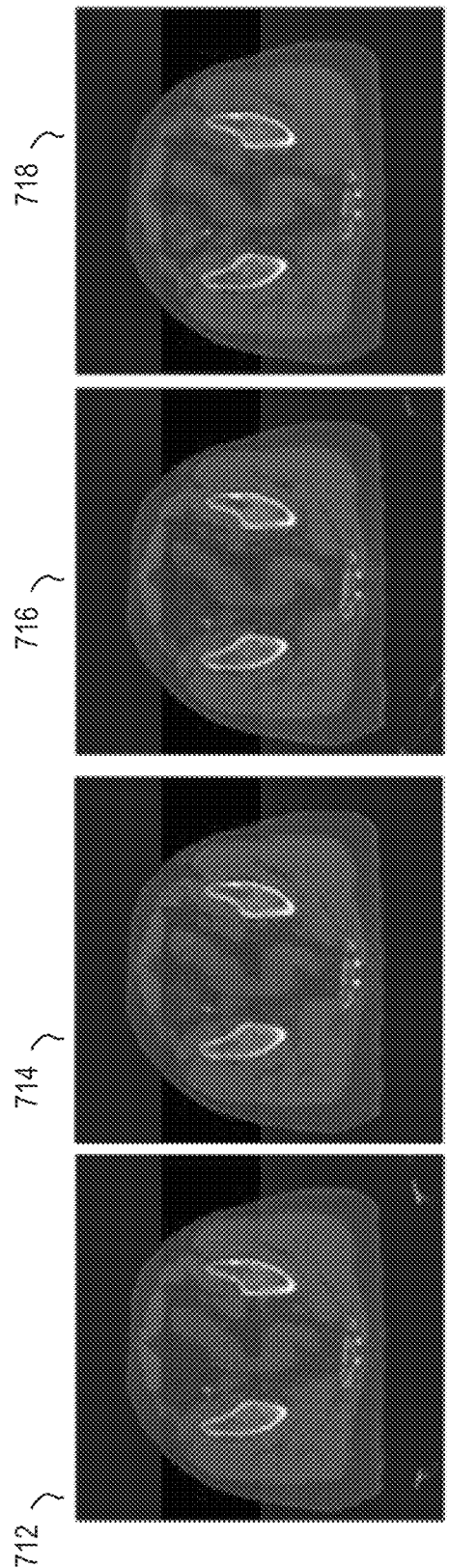

FIG. 7 illustrates a pair of CBCT and real CT input images used in connection with training and generating sCT image model. In FIG. 7, image 702 shows an input CBCT image that is paired with a real CT image 704. Image 706 represents an image used as a map of anatomical areas 424 to provide the image similarity metric (e.g., the SSIM weight) and image 708 is an image used as a map of anatomical areas 424 to provide the thresholded similarity metric (e.g., the thresholded-SSIM weight). After the generator of the Cycle-GAN has been trained, a new CBCT image may be received. The CycleGAN may process the new CBCT image (e.g., image 702) and output an sCT image 712. To further improve the quality of the output of the CycleGAN, a pixel based loss term (or weighted and/or thresholded weighted pixel based loss term) may be used in training the Cycle-GAN or GAN model. In such circumstances, after receiving an input image 702, the CycleGAN or GAN (trained based on the pixel based loss term) may output an sCT image 714. In particular, sCT image 714 may be an sCT image obtained by the CycleGAN with traditional L1 regularization. In some implementations, after receiving an input image 702, the CycleGAN or GAN (trained based a pixel-based loss term that takes into account an image metric, such as SSIM map image 706) may output an sCT image 716. In particular, sCT image 716 may be an sCT image obtained by the CycleGAN with SSIM-weighted L1-loss. In some implementations, after receiving an input image 702, the Cycle-GAN or GAN (trained based a thresholded-pixel-based loss term that takes into account an image metric, such as a thresholded-SSIM map image 708) may output an sCT image 718. In particular, sCT image 718 may be an sCT image obtained by the CycleGAN with thresholded-SSIM-weighted L1-loss. As discussed herein, the pixel based loss term (or weighted and/or thresholded weighted pixel based loss term) may represent a pixel value based expected difference between all or a threshold number of sCT images and real CT images and/or CBCT images and sCBCT images.

Figure 8:
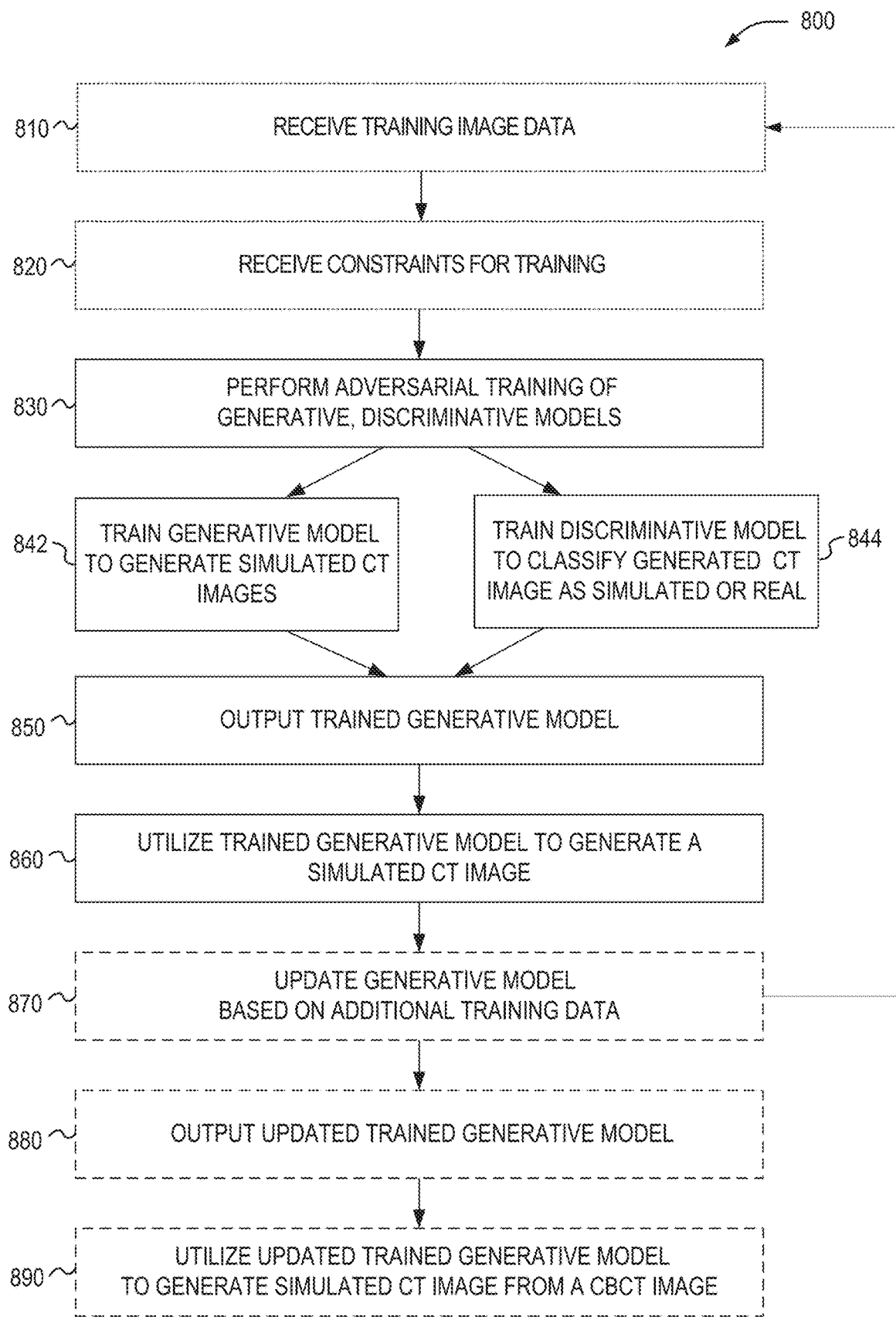
FIG. 8 illustrates a flowchart of exemplary operations for training a generative model adapted for outputting a sCT image from a received CBCT image according to some examples of the disclosure.

FIG. 8 illustrates a flowchart of a process 800 of exemplary operations for training a generative model adapted for outputting a sCT image from an input CBCT image. The process 800 is illustrated from the perspective of a radiotherapy treatment processing system 100, which trains and utilizes a generative model using a GAN or CycleGAN as discussed in the preceding examples. However, corresponding operations may be performed by other devices or systems (including in offline training or verification settings separate from a particular image processing workflow or medical treatment).

As shown, a first phase of the flowchart workflow begins with operations (810, 820) to establish the parameters of training and model operations. The flowchart 800 begins with operations to receive (e.g., obtain, extract, identify) training image data (operation 810) and constraints or conditions for training (operation 820). In an example, this training image data may comprise image data from a plurality of human subjects, relating to a particular condition, anatomical feature, or anatomical area-such as pairs of CBCT and real CT images of a target region. Also in an example, the constraints may relate to an imaging device, a treatment device, a patient, or medical treatment considerations. In an example, these constrains may include adversarial losses, cycle consistency based losses and a pixel based value loss term (or weighted and/or thresholded weighted pixel based loss term).

The second phase of the flowchart 800 continues with training operations, including adversarial training of generative and discriminative models in a generative adversarial network (operation 830). In an example, the adversarial training includes training the generative model to generate a simulated CT image from an input CBCT image (operation 842) and training the discriminative model to classify a generated CT image as simulated or real training data (operation 844). Also in this adversarial training, the output of the generative model is used for training the discriminative model, and the output of the discriminative model is used for training the generative model. In various examples, the generative model and the discriminative model comprise respective convolutional neural networks (e.g., as discussed with reference to FIGS. 3A and 3B respectively above). In further examples, the generative adversarial network is a cycle generative adversarial network (e.g., as discussed with reference to FIG. 6 above) where multiple generative and adversarial models are employed and the output from one generative model is provided as an input to a second generative model.

The flowchart 800 continues with the output of the generative model for use in generating a sCT image (operation 850), as the generative model is adapted to generate a sCT image based on an input CBCT image of a subject. The generative model may be employed in any component in system 100 to enhance CBCT images or perform image processing. In some implementations, the generative model may be added to system 100 from an external source (e.g., a third party vendor).

The flowchart 800 continues with the utilization of the trained generative model to generate a sCT image (operation 860) based on an input CBCT image of a subject. The generative model may be employed in any component in system 100 to enhance CBCT images or perform image processing. In some implementations, the generative model may be added to system 100 from an external source (e.g., a third party vendor).

The flowchart 800 concludes with a final phase to implement updates to the generative model, including updating the generative model based on additional training data (operation 870) and outputting the updated trained generative model (operation 880). In various examples, the updating may be produced in connection with the receipt of additional training image data and constraints (e.g., in a manner similar to operations 810, 820), or the performance of additional adversarial training (e.g., in a manner similar to operations 830, 842, 844). In further examples, the generative model may be specifically updated based on approval, changes, or use of the sCT images (e.g., resulting from modification, verification, or changes to the image data by a medical professional). The flowchart concludes with the use of the updated trained generative model (operation 890), such as may be performed in uses of the updated generative model for subsequent radiotherapy treatments.

As discussed above with reference to FIGS. 6 and 8, the generative adversarial network may be a cycle generative adversarial network comprising the generative model and a discriminative model.

As previously discussed, respective electronic computing systems or devices may implement one or more of the methods or functional operations as discussed herein. In one or more embodiments, the radiotherapy processing computing system 110 may be configured, adapted, or used to control or operate the image-guided radiation therapy device 202, perform or implement the training or prediction operations from model 300, operate the trained generator model 460, perform or implement the data flows 500, 550, 600, perform or implement the operations of the flowchart 800, or perform any one or more of the other methodologies discussed herein (e.g., as part of image processing logic 120 and the workflows 130, 140). In various embodiments, such electronic computing systems or devices operates as a standalone device or may be connected (e.g., networked) to other machines. For instance, such computing systems or devices may operate in the capacity of a server or a client machine in server-client network environment, or as a peer machine in a peer-to-peer (or distributed) network environment. Features of computing systems or devices may be embodied by a personal computer (PC), a tablet PC, a Personal Digital Assistant (PDA), a cellular telephone, a web appliance, or any machine capable of executing instructions (sequential or otherwise) that specify actions to be taken by that machine.

As also indicated above, the functionality discussed above may be implemented by instructions, logic, or other information storage on a machine readable medium. While the machine-readable medium may have been described in various examples with reference to be a single medium, the term "machine-readable medium" may include a single medium or multiple media (e.g., a centralized or distributed database, and/or associated caches and servers) that store the one or more transitory or non-transitory instructions or data structures. The term "machine-readable medium" shall also be taken to include any tangible medium that is capable of storing, encoding or carrying transitory or non-transitory instructions for execution by the machine and that cause the machine to perform any one or more of the methodologies of the present invention, or that is capable of storing, encoding or carrying data structures utilized by or associated with such instructions.

The above detailed description includes references to the accompanying drawings, which form a part of the detailed description. The drawings show, by way of illustration but not by way of limitation, specific embodiments in which the invention can be practiced. These embodiments are also referred to herein as "examples." Such examples can include elements in addition to those shown or described. However, this disclosure also contemplates examples in which only those elements shown or described are provided. Moreover, the disclosure also contemplates examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a," "an," "the," and "said" are used when introducing elements of aspects of the invention or in the embodiments thereof, as is common in patent documents, to include one or more than one or more of the elements, independent of any other instances or usages of "at least one" or "one or more." In this document, the term "or" is used to refer to a nonexclusive or, such that "A or B" includes "A but not B," "B but not A," and "A and B," unless otherwise indicated.

In the appended claims, the terms "including" and "in which" are used as the plain-English equivalents of the respective terms "comprising" and "wherein." Also, in the following claims, the terms "comprising." "including," and "having" are intended to be open-ended to mean that there may be additional elements other than the listed elements, such that after such a term (e.g., comprising, including, having) in a claim are still deemed to fall within the scope of that claim. Moreover, in the following claims, the terms "first," "second," and "third." etc., are used merely as labels, and are not intended to impose numerical requirements on their objects.

The present invention also relates to a computing system adapted, configured, or operated for performing the operations herein. This system may be specially constructed for the required purposes, or it may comprise a general purpose computer selectively activated or reconfigured by a computer program (e.g., instructions, code, etc.) stored in the computer. The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In view of the above, it will be seen that the several objects of the invention are achieved and other advantageous results attained. Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

The examples described herein may be implemented in a variety of embodiments. For example, one embodiment includes a computing device including processing hardware (e.g., a processor or other processing circuitry) and memory hardware (e.g., a storage device or volatile memory) including instructions embodied thereon, such that the instructions, which when executed by the processing hardware, cause the computing device to implement, perform, or coordinate the electronic operations for these techniques and system configurations. Another embodiment discussed herein includes a computer program product, such as may be embodied by a machine-readable medium or other storage device, which provides the transitory or non-transitory instructions to implement, perform, or coordinate the electronic operations for these techniques and system configurations. Another embodiment discussed herein includes a method operable on processing hardware of the computing device, to implement, perform, or coordinate the electronic operations for these techniques and system configurations.

In further embodiments, the logic, commands, or transitory or non-transitory instructions that implement aspects of the electronic operations described above, may be provided in a distributed or centralized computing system, including any number of form factors for the computing system such as desktop or notebook personal computers, mobile devices such as tablets, netbooks, and smartphones, client terminals and server-hosted machine instances, and the like. Another embodiment discussed herein includes the incorporation of the techniques discussed herein into other forms, including into other forms of programmed logic, hardware configurations, or specialized components or modules, including an apparatus with respective means to perform the functions of such techniques. The respective algorithms used to implement the functions of such techniques may include a sequence of some or all of the electronic operations described above, or other aspects depicted in the accompanying drawings and detailed description below.

The above description is intended to be illustrative, and not restrictive. For example, the above-described examples (or one or more aspects thereof) may be used in combination with each other. In addition, many modifications may be made to adapt a particular situation or material to the teachings of the invention without departing from its scope. While the dimensions, types of materials and example parameters, functions, and implementations described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled.

Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A computer implemented method for generating an enhanced cone-beam computed tomography, CBCT, image using a trained model, the method comprising:
   receiving a CBCT image of a subject;
   generating, using a generative model comprising a deep convolutional neural network, a synthetic computed tomography, sCT, image corresponding to the CBCT image, the generative model trained in, a generative adversarial network, GAN, wherein the generative model is further trained to process the CBCT image as an input and provide the sCT image as an output, the deep convolutional neural network being trained to establish a relationship between paired sets of training CBCT images and real CT images, the deep convolutional neural network being trained to:
      extract one or more features from a given one of the training CBCT images;
      process the one or more features to generate an estimated sCT image;
      compute a difference between the estimated sCT image with a real CT image corresponding to the given one of the training CBCT images; and
      update one or more parameters of the deep convolutional neural network based on the computed difference, wherein, after being trained, the deep convolutional neural network receives the CBCT image of the subject and generates the sCT image; and
   presenting the sCT image for medical analysis of the subject.

2. The method of claim 1, wherein:
   the generative adversarial network is configured to train the generative model using a discriminative model;
   values applied by the generative model and the discriminative model are established using adversarial training between the discriminative model and the generative model; and
   the generative model and the discriminative model comprise respective convolutional neural networks.

3. The method of claim 2, wherein:
   the adversarial training comprises training the generative model to generate a given sCT image from a given CBCT image, and training the discriminative model to classify the given sCT image as a synthetic or a real computed tomography, CT, image, and
   the output of the generative model is used for training the discriminative model and an output of the discriminative model is used for training the generative model.

4. The method of claim 1, wherein the generative adversarial network is trained using a cycle generative adversarial network, CycleGAN, comprising the generative model and a discriminative model, wherein the generative model is a first generative model, the discriminative model is a first discriminative model, wherein the CycleGAN further comprises:
   a second generative model trained to process a given CT image as an input and provide a given synthetic, sCBCT, image as an output; and
   a second discriminative model trained to classify the given sCBCT image as a synthetic or a real CBCT image.

5. The method of claim 4, wherein the CycleGAN comprises first and second portions to train the first generative model, and wherein:

the first portion is trained to:
obtain a training CBCT image that is paired with a real CT image;
transmit the training CBCT image to the input of the first generative model to output a given synthetic CT image; and
receive the given synthetic CT image at the input of the first discriminative model to classify the given synthetic CT image as a synthetic or real CT image and at the input of the second generative model to generate a cycle CBCT image for calculating cycle-consistency losses; and the second portion is trained to:
transmit the real CT image to the input of the second generative model to output a given synthetic CBCT image; and
receive the given synthetic CBCT image at the input of the second discriminative model to classify the given synthetic CBCT image as a synthetic or real CBCT image and at the input of the first generative model to generate a cycle CT image for calculating cycle-consistency losses.

6. The method of claim 5, wherein the first generative model is trained to minimize or reduce a first pixel based loss term that represents an expectation of difference between a plurality of synthetic CT images and respectively paired real CT images and the second generative model is trained to minimize or reduce a second pixel based loss term that represents an expectation of difference between a plurality of synthetic CBCT images and respectively paired real CBCT images.

7. The method of claim 6, wherein the CycleGAN is trained to apply a metric to the first and second pixel based loss terms, the metric generated based on a map having a same size as a pair of a CBCT images and real CT images, such that each pixel value in the map represents a similarity level between a given CBCT image and a given real CT image that is paired with the given CBCT image.

8. The method of claim 7, wherein the CycleGAN is trained to apply a threshold to the metric such that when the similarity level exceeds the threshold, the metric is applied to the first and second pixel based loss terms and otherwise a zero value is applied to the first and second pixel based loss terms.

9. The method of claim 1, wherein the generative adversarial network is trained in accordance with an objective function that is based on adversarial losses, cycle-consistency losses and pixel based loss terms.

10. A computer implemented method for training a model to generate an enhanced cone-beam computed tomography, CBCT, image, the method comprising:
receiving a CBCT image of a subject as an input of a generative model; and
training the generative model comprising a deep convolutional neural network in a generative adversarial network, GAN, to process the CBCT image to provide a synthetic computed tomography, sCT, image corresponding to the CBCT image as an output of the generative model the deep convolutional neural network being trained to:
extract one or more features from a given one of the training CBCT images;
process the one or more features to generate an estimated sCT image;
compute a difference between the estimated sCT image with a real CT image corresponding to the given one of the training CBCT images; and
update one or more parameters of the deep convolutional neural network based on the computed difference, wherein, after being trained, the deep convolutional neural network receives the CBCT image of the subject and generates the sCT image.

11. The method of claim 10, wherein the generative adversarial network is trained using a cycle generative adversarial network, CycleGAN, comprising the generative model and a discriminative model, wherein the generative model is a first generative model, the discriminative model is a first discriminative model, further comprising:
training a second generative model to process a given CT image as an input and provide a given synthetic, sCBCT, image as an output; and
training a second discriminative model to classify the given sCBCT image as a synthetic or a real CBCT image.

12. The method of claim 11, wherein the CycleGAN comprises first and second portions to train the first generative model, further comprising:
obtaining a training CBCT image that is paired with a real CT image;
transmitting the training CBCT image to the input of the first generative model to output a given synthetic CT image;
receiving the given synthetic CT image at the input of the first discriminative model;
classifying, with the first discriminative model, the given synthetic CT image as a synthetic or real CT image;
receiving the given synthetic CT image at the input of the second generative model to generate a cycle CBCT image for calculating cycle-consistency losses;
transmitting the real CT image to the input of the second generative model to output a synthetic training CBCT image;
receiving the synthetic training CBCT image at the input of the second discriminative model to classify the synthetic training CBCT image as a synthetic or real CBCT image and at the input of the first generative model to generate a cycle CT image for calculating cycle-consistency losses;
training the first generative model to minimize or reduce a first pixel based loss term that represents an expectation of difference between a plurality of synthetic CT images and respectively paired real CT images; and
training the second generative model to minimize or reduce a second pixel based loss term that represents an expectation of difference between a plurality of synthetic CBCT images and respectively paired real CBCT images.

13. A system comprising:
a processor configured to perform operations comprising:
receiving a CBCT image of a subject;
generating, using a generative model comprising a deep convolutional neural network, a synthetic computed tomography, sCT, image corresponding to the CBCT image, the generative model trained in, a generative adversarial network, GAN, wherein the generative model is further trained to process the CBCT image as an input and provide the sCT image as an output, the deep convolutional neural network being trained to establish a relationship between paired sets of training CBCT images and real CT images, the deep convolutional neural network being trained to:
extract one or more features from a given one of the training CBCT images;

process the one or more features to generate an estimated sCT image;

compute a difference between the estimated sCT image with a real CT image corresponding to the given one of the training CBCT images; and update one or more parameters of the deep convolutional neural network based on the computed difference, wherein, after being trained, the deep convolutional neural network receives the CBCT image of the subject and generates the sCT image; and presenting the sCT image for medical analysis of the subject.

14. The system of claim 13, wherein:

the generative adversarial network is configured to train the generative model using a discriminative model;

values applied by the generative model and the discriminative model are established using adversarial training between the discriminative model and the generative model; and the generative model and the discriminative model comprise respective convolutional neural networks.

15. The system of claim 14, wherein:

the adversarial training comprises training the generative model to generate a given sCT image from a given CBCT image, and training the discriminative model to classify the given sCT image as a synthetic or a real computed tomography, CT, image, and the output of the generative model is used for training the discriminative model and an output of the discriminative model is used for training the generative model.

16. The system of claim 13, wherein the generative adversarial network is trained using a cycle generative adversarial network, CycleGAN, comprising the generative model and a discriminative model, wherein the generative model is a first generative model, the discriminative model is a first discriminative model, wherein the CycleGAN further comprises:

a second generative model trained to process a given CT image as an input and provide a given synthetic, sCBCT, image as an output; and a second discriminative model trained to classify the given sCBCT image as a synthetic or a real CBCT image.

17. The system of claim 16, wherein the CycleGAN comprises first and second portions to train the first generative model, and wherein:

the first portion is trained to:

obtain a training CBCT image that is paired with a real CT image;

transmit the training CBCT image to the input of the first generative model to output a given synthetic CT image; and receive the given synthetic CT image at the input of the first discriminative model to classify the given synthetic CT image as a synthetic or real CT image and at the input of the second generative model to generate a cycle CBCT image for calculating cycle-consistency losses; and the second portion is trained to:

transmit the real CT image to the input of the second generative model to output a given synthetic CBCT image; and receive the given synthetic CBCT image at the input of the second discriminative model to classify the given synthetic CBCT image as a synthetic or real CBCT image and at the input of the first generative model to generate a cycle CT image for calculating cycle-consistency losses.

18. The system of claim 17, wherein the first generative model is trained to minimize or reduce a first pixel based loss term that represents an expectation of difference between a plurality of synthetic CT images and respectively paired real CT images and the second generative model is trained to minimize or reduce a second pixel based loss term that represents an expectation of difference between a plurality of synthetic CBCT images and respectively paired real CBCT images.

19. The system of claim 18, wherein the CycleGAN is trained to apply a metric to the first and second pixel based loss terms, the metric generated based on a map having a same size as a pair of a CBCT images and real CT images, such that each pixel value in the map represents a similarity level between a given CBCT image and a given real CT image that is paired with the given CBCT image.

20. The system of claim 13, wherein the generative adversarial network is trained in accordance with an objective function that is based on adversarial losses, cycle-consistency losses and pixel based loss terms.

* * * * *